US012641564B2

(12) United States Patent
Yu et al.

(10) Patent No.: US 12,641,564 B2
(45) Date of Patent: May 26, 2026

(54) UPLINK POSITIONING METHOD AND COMMUNICATION APPARATUS

(71) Applicant: HUAWEI TECHNOLOGIES CO., LTD., Shenzhen (CN)

(72) Inventors: Yingjie Yu, Shanghai (CN); Yinghao Guo, Shanghai (CN); Su Huang, Shanghai (CN); Yinghao Jin, Boulogne Billancourt (FR); Yi Wang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 248 days.

(21) Appl. No.: 18/342,121

(22) Filed: Jun. 27, 2023

(65) Prior Publication Data

US 2023/0337176 A1 Oct. 19, 2023

Related U.S. Application Data

(63) Continuation of application No. PCT/CN2021/104338, filed on Jul. 2, 2021.

(30) Foreign Application Priority Data

Dec. 29, 2020 (WO) ................ PCT/CN2020/141040

(51) Int. Cl.
    *H04W 64/00* (2009.01)
    *H04L 5/00* (2006.01)
(52) U.S. Cl.
    CPC .......... *H04W 64/00* (2013.01); *H04L 5/0048* (2013.01)
(58) Field of Classification Search
    CPC .......................... H04W 64/00; H04L 5/0048
    See application file for complete search history.

(56) References Cited

U.S. PATENT DOCUMENTS

2023/0300942 A1* 9/2023 Quan .................... H04W 76/30
                                                               370/329

FOREIGN PATENT DOCUMENTS

| CN | 107155200 A | 9/2017 |
| CN | 108023697 A | 5/2018 |
| WO | 2020140668 A1 | 7/2020 |

OTHER PUBLICATIONS

3rd Generation Partnership Project; Technical Specification Group Radio Access Network; Evolved Universal Terrestrial Radio Access Network (E-UTRAN); Stage 2 functional specification of User Equipment (UE) positioning in E-UTRAN (Release 15), 3GPP TS 36.305 V15.0.0 (Jul. 2018), Technical Specification, total 85 pages.

(Continued)

*Primary Examiner* — Curtis B Odom
(74) *Attorney, Agent, or Firm* — Rimon PC

(57) ABSTRACT

Embodiments of an uplink positioning method and a communication apparatus are provided that reduce power consumption of a terminal in a positioning process in order to meet a requirement for low power consumption. In the method, a terminal receives first indication information and a first message, and sends, in a positioning area indicated by the first indication information, a reference signal based on resource configuration information corresponding to the positioning area. The first indication information indicates one or more positioning areas, where the first message includes one or more pieces of resource configuration information. Each piece of resource configuration information corresponds to one positioning area, each piece of resource configuration information is used to configure a resource for the terminal to send the reference signal, and the reference signal is used to determine a location of the terminal.

20 Claims, 6 Drawing Sheets

(56) References Cited

OTHER PUBLICATIONS

3rd Generation Partnership Project; Technical Specification Group Radio Access Network; NG Radio Access Network (NG-RAN); Stage 2 functional specification of User Equipment (UE) positioning in NG-RAN (Release 15), 3GPP TS 38.305 V15.0.0 (Jun. 2018), Technical Specification, total 57 pages.

3rd Generation Partnership Project; Technical Specification Group Radio Access Network; Evolved Universal Terrestrial Radio Access (E-UTRA); LTE Positioning Protocol A (LPPa) (Release 15), 3GPP TS 36.455 V15.0.0 (Jun. 2018), Technical Specification, total 83 pages.

3rd Generation Partnership Project; Technical Specification Group Radio Access Network; Evolved Universal Terrestrial Radio Access Network (E-UTRAN); SLm interface Application Protocol (SLmAP) (Release 15), 3GPP TS 36.459 V15.0.0 (Jun. 2018), Technical Specification, total 47 pages.

3rd Generation Partnership Project; Technical Specification Group Radio Access Network; Evolved Universal Terrestrial Radio Access (E-UTRA); Radio Resource Control (RRC); Protocol specification (Release 15), 3GPP TS 36.331 V15.2.2 (Jun. 2018), Technical Specification, total 791 pages.

3rd Generation Partnership Project; Technical Specification Group Radio Access Network; LTE Positioning Protocol (LPP) (Release 16), 3GPP TS 37.355 V16.2.0 (Sep. 2020), Technical Specification, total 296 pages.

3GPP TS 38.331 V16.2.0 (Sep. 2020),3rd Generation Partnership Project; Technical Specification Group Radio Access Network;NR-;Radio Resource Control (RRC)Protocol specification(Release 16), total 921 pages.

3GPP TS 38.214 V16.3.0 (Sep. 2020), 3rd Generation Partnership Project; Technical Specification Group Radio Access Network;NR;Physical layer procedures for data(Release 16), 166 pages.

* cited by examiner

6/6

UPLINK POSITIONING METHOD AND COMMUNICATION APPARATUS

CROSS-REFERENCE TO RELATED APPLICATION

This application is a continuation of International Application No. PCT/CN2021/104338, filed on Jul. 2, 2021, which claims priority to International Patent Application No. PCT/CN2020/141040, filed on Dec. 29, 2020. The disclosures of the aforementioned applications are hereby incorporated by reference in their entireties.

TECHNICAL FIELD

This application generally relates to the field of positioning technologies, and in particular, to an uplink positioning method and a communication apparatus.

BACKGROUND

In an existing uplink positioning procedure, a serving base station configures, for a terminal, a resource (also referred to as a sounding reference signal (SRS) resource) that is used to send a SRS, and the serving base station notifies the terminal of the SRS resource. The terminal may send the SRS on the SRS resource for subsequent positioning.

Generally an SRS resource is configured based on a cell level, that is, an SRS resource is configured for each cell. As the terminal moves, the terminal may move from one cell (e.g., a current cell) to another cell (for example, referred to as a target cell). In this scenario, the terminal performs a cell handover. In a cell handover process, an SRS resource that is configured by the serving base station for the current cell is released. After the terminal reestablishes a radio resource control (RRC) connection to the target cell, the terminal obtains an SRS resource configured for the target cell to then send the SRS on the SRS resource.

Due to the mobility of the terminal in a positioning process, the terminal needs to obtain an SRS resource configuration frequently. As a result, power consumption of the terminal is increased resulting in the power consumption to become high. This is contrary to a requirement of the terminal for achieving low power consumption.

SUMMARY

Embodiments of this application provide for an uplink positioning method and a communication apparatus with reduced power consumption of a terminal during a positioning process, and to meet a requirement for low power consumption.

According to a first aspect, an uplink positioning method is provided. The method may be performed by a first communication apparatus. The first communication apparatus may be a communication device or a communication apparatus that can support the communication device in implementing a function required for the method, for example, a chip system. An example in which the communication device is a terminal is used below for description. The method includes:

The terminal receives first indication information and a first message, and sends, in a positioning area indicated by the first indication information, a reference signal based on resource configuration information corresponding to the positioning area. The first indication information indicates one or more positioning areas, and/or a plurality of cells included in each of the one or more positioning areas. The first message includes one or more pieces of resource configuration information and each piece of resource configuration information is used to configure a reference signal resource. The reference signal resource is used by the terminal to send the reference signal, the reference signal is used to determine a location of the terminal, and each piece of resource configuration information corresponds to one positioning area. In this solution, the reference signal may be considered as a reference signal used for positioning, and a plurality of cells may be considered as one positioning area. Herein, one reference signal resource is configured for one positioning area, that is, a plurality of cells correspond to one reference signal resource. In this way, in a positioning process, only when the terminal moves from one positioning area to another positioning area, a corresponding reference signal resource needs to be re-obtained to send the reference signal. In conventional technologies, one cell corresponds to one reference signal resource, that is, a reference signal resource needs to be re-obtained after handover from one cell to another cell. However in this solution, the terminal does not need to obtain reference signal resource configuration information frequently. This can reduce energy consumption of the terminal.

In a possible implementation, that the terminal sends, in the positioning area indicated by the first indication information, the reference signal based on the resource configuration information corresponding to the positioning area includes:

The terminal is handed over from a first cell to a second cell; and when determining that the second cell is in a first positioning area, the terminal sends the reference signal based on first resource configuration information corresponding to the first positioning area; or when determining that the second cell is in a second positioning area, the terminal obtains second resource configuration information corresponding to the second positioning area, and sends the reference signal based on the second resource configuration information, where the first cell is in the first positioning area. It should be understood that the terminal re-obtains a reference signal resource only when the terminal moves from one positioning area to another positioning area. In this case, if the terminal is handed over from one cell (e.g., the first cell) to another cell (e.g., the second cell), whether the terminal moves from one positioning area to another positioning area may be determined in order to determine whether a reference signal resource needs to be re-obtained. For example, although the terminal moves from the first cell to the second cell, the terminal is still in an original positioning area (the first positioning area). In this case, the terminal sends the reference signal by still using the obtained reference signal resource, and does not need to re-obtain a reference signal resource when the terminal is handed over to the second cell. This reduces power consumption of the terminal.

In a possible implementation, that the terminal sends, in the positioning area indicated by the first indication information, the reference signal based on the resource configuration information corresponding to the positioning area includes:

The terminal is handed over from the first cell to the second cell, and obtains a cell index of the second cell; and when determining that the cell index of the second cell is in a first cell index list, the terminal sends the reference signal based on first resource configuration information corresponding to the first cell index list; or when determining that the cell index of the second cell is in a second cell index list, the terminal obtains second resource configuration information corresponding to the second cell index list, and sends the reference signal based on the second resource configuration information, where a cell index of the first cell is in the first cell index list. It should be understood that, if the first indication information indicates the cell index list, when being handed over from the first cell to the second cell, the terminal may determine, based on the cell index of the second cell, whether a reference signal resource needs to be re-obtained.

In a possible implementation, the method further includes:

The terminal receives second indication information, and sends, in a positioning area indicated by the second indication information, the reference signal based on resource configuration information corresponding to the positioning area. The second indication information indicates one or more positioning areas, and/or a plurality of cells included in each of the one or more positioning areas, and a priority of the second indication information is higher than a priority of the first indication information. In this solution, a network device may configure one or more same positioning areas and a reference signal resource corresponding to each positioning area for all terminals by using the first indication information. Certainly, the network device may alternatively configure, for each terminal by using the second indication information, a positioning area of the terminal and a corresponding reference signal resource. In this way, a dedicated positioning area and a corresponding reference signal resource can be configured for the terminal based on an actual requirement, to meet an actual application requirement. It should be understood that the second indication information is specific to each terminal, and the first indication information is applicable to all terminals. Therefore, it may be considered that the priority of the second indication information is higher than the priority of the first indication information. In other words, after receiving the first indication information and the second indication information, the terminal may send the reference signal based on the positioning area indicated by the second indication information and the corresponding reference signal resource.

In a possible implementation, there are a plurality of implementations of the first indication information. This is not limited to some embodiments of this application, and implementation of the first indication information may be flexibly applied.

In an example implementation 1, the first indication information may include one or more positioning area indexes, where one positioning area index corresponds to one positioning area. In this solution, one positioning area may include a plurality of cells, and the positioning area including the plurality of cells is indicated by using a positioning area index. The terminal may determine, by using the first indication information and a predefined positioning area index and cell index list, a positioning area to which a current area in which the terminal is located belongs. In this manner, the first indication information carries a small amount of information, so that signaling overheads can be reduced.

In an example implementation 2, the first indication information may include one or more cell index lists, one cell index list corresponds to one positioning area, and one cell index in one cell index list corresponds to one cell. In this solution, the first indication information may indicate the positioning area by using the cell index list. This approach provides a straightforward approach for utilizing the first indication information.

In an example implementation 3, the first indication information may include one or more positioning area indexes and a cell index list corresponding to each positioning area index. In this solution, the first indication information may indicate the positioning area index and the cell index list corresponding to each positioning area index, that is, a correspondence between a positioning area and a plurality of cells may be indicated by using the first indication information, and the correspondence between the positioning area and the plurality of cells is not unique. This approach provides flexibility in utilizing the first indication information.

In a possible implementation, cell indexes included in different cell index lists are partially the same. In this solution, different positioning areas may include a same cell, to ensure high positioning precision. For example, in a possible scenario, if the terminal moves to an edge of a positioning area, but a base station on which the terminal camps (e.g., is located) happens to be in another neighboring positioning area, the terminal may send the reference signal on a reference signal resource of the another positioning area to improve positioning precision.

In a possible implementation, the first indication information further includes one or more reference signal resource indexes, where one reference signal resource index corresponds to one positioning area or one cell index list. In this solution, a plurality of positioning areas may share one reference signal resource, or one reference signal resource may be configured for each of the plurality of positioning areas. The network device may configure one or more pieces of reference signal resource information by using the first indication information, for example, configure one or more reference signal resource indexes. When moving from one positioning area to another positioning area, the terminal may send the reference signal on a reference signal resource that corresponds to the another positioning area and that is indicated by the first indication information, and does not need to re-obtain a reference signal resource, so that complex steps (i.e., such as in conventional technologies) can be avoided in a positioning process.

In a possible implementation, the method further includes:

The terminal is handed over from the first cell to the second cell; and when determining that the second cell is in a third cell index list, the terminal determines a reference signal resource index corresponding to the third cell index list, and sends the reference signal based on a reference signal resource corresponding to the reference signal resource index. Similarly, the terminal is handed over from the first cell to the second cell; and when determining that the second cell is in a third positioning area, the terminal determines a reference signal resource index corresponding to the third positioning area, and sends the reference signal based on a reference signal resource corresponding to the reference signal resource index. In this solution, if the network device configures one reference signal resource for one positioning area, when the terminal is handed over from one cell to another cell, the terminal only needs to determine a positioning area that the another cell is in, to send the reference signal on a reference signal resource corresponding to the positioning area, and does not need to re-obtain a reference signal resource.

In a possible implementation, before that the terminal receives first indication information, the method further includes: the terminal sends a second message, where the second message includes one or more of the following information: positioning precision information, battery capacity information of the terminal, or energy saving requirement information of the terminal. In this solution, the terminal may send the second message to the network device to provide some terminal information, such as the battery capacity information and the energy saving requirement information for the network device, to request the network device to configure a positioning area for the terminal based on an actual requirement (for example, a positioning precision requirement or an energy consumption requirement) of the terminal.

For example, the first indication information may be determined based on the second message. In this solution, the network device may configure a positioning area for the terminal based on an actual requirement of the terminal to better meet the actual requirement of the terminal. For example, if the terminal has a high positioning precision requirement, the positioning area configured by the network device for the terminal includes a small quantity of cells. If the terminal has a low positioning precision requirement, the positioning area configured by the network device for the terminal includes a large quantity of cells.

In a possible implementation, the first indication information is carried in a system message (SIB), a positioning system message (Pos SIB), a radio resource control (RRC) message, or a positioning protocol (e.g., long term evolution (LTE) positioning protocol, LPP) message. In this solution, the first indication information may be sent by the network device to the terminal, or may be sent by a location management function (LMF) to the terminal. For example, the network device may reuse existing signaling, for example, the SIB or the Pos SIB to carry the first indication information. In this way, only one piece of signaling needs to be sent, and positioning areas may be configured for a plurality of terminals. For example, the network device may alternatively include the first indication information in RRC signaling. In this way, for each terminal, a positioning area of the terminal may be configured for the terminal. For example, the LMF may use dedicated signaling that is used for positioning, for example, the LPP message to carry the first indication information. A specific manner of carrying the first indication information is not limited in some embodiments.

According to a second aspect, an uplink positioning method is provided. The method may be performed by a second communication apparatus. The second communication apparatus may be a communication device or a communication apparatus that can support the communication device in implementing a function required for the method, for example, a chip system. An example in which the communication device is a network device is used below for description. The method includes: sending first indication information and a first message, where the first indication information indicates one or more positioning areas, and/or a plurality of cells included in each of the one or more positioning areas, the first message includes one or more pieces of resource configuration information, each piece of resource configuration information is used to configure a reference signal resource, the reference signal resource is used by a terminal to send a reference signal, the reference signal is used to determine a location of the terminal, and each piece of resource configuration information corresponds to one positioning area. The method further includes receiving and measuring the reference signal to obtain a positioning measurement result; and sending the positioning measurement result to a location management device function, where the positioning measurement result is used to determine the location of the terminal.

In a possible implementation, the method further includes:

The network device sends second indication information, where the second indication information indicates one or more positioning areas, and/or a plurality of cells included in each of the one or more positioning areas, and a priority of the second indication information is higher than a priority of the first indication information.

In a possible implementation, the first indication information includes one or more positioning area indexes, and one positioning area index corresponds to one positioning area.

In a possible implementation, the first indication information includes one or more cell index lists, one cell index list corresponds to one positioning area, and one cell index in one cell index list corresponds to one cell.

In a possible implementation, cell indexes included in different cell index lists are partially the same.

In a possible implementation, the first indication information further includes one or more reference signal resource indexes, where one reference signal resource index corresponds to one positioning area or one cell index list.

In a possible implementation, the method further includes:

The network device receives a second message, where the second message includes one or more of the following information: positioning precision information, battery capacity information of the terminal, or energy saving requirement information of the terminal.

In a possible implementation, the method further includes:

The network device determines the first indication information based on the second message.

In a possible implementation, the first indication information is carried in a SIB, a Pos SIB, or an RRC message.

For technical effects achieved by the second aspect or the possible implementations of the second aspect, refer to the descriptions of the technical effects of the first aspect or the possible implementations of the first aspect. Details are not described herein again.

According to a third aspect, an uplink positioning method is provided. The method may be performed by a third communication apparatus. The third communication apparatus may be a communication device or a communication apparatus that can support the communication device in implementing a function required for the method, for example, a chip system. An example in which the communication device is an LMF is used below for description. The method includes sending first indication information, receiving a positioning measurement result, and determining a location of a terminal based on the positioning measurement result, where the first indication information indicates one or more positioning areas, and/or a plurality of cells included in each of the one or more positioning areas, and the positioning measurement result is obtained by performing measurement based on a reference signal sent by the terminal. In this solution, the LMF may configure a positioning area for the terminal, to indicate the terminal to be handed over from one cell to another cell in the positioning area, and send the reference signal by using an obtained reference signal resource, without a need to re-obtain a reference signal resource, so that unnecessary steps can be reduced in a positioning process, and a positioning delay is reduced.

In a possible implementation, the method further includes: receiving a second message, where the second message includes one or more of the following information: positioning precision information, battery capacity information of the terminal, or energy saving requirement information of the terminal. In this solution, the terminal may send the second message to the LMF, to provide some terminal information such as the battery capacity information and the energy saving requirement information for the LMF, to request the LMF to configure a positioning area for the terminal based on an actual requirement (for example, a positioning precision requirement or an energy consumption requirement) of the terminal.

In a possible implementation, the first indication information or the second message is carried in an LPP message, that is, carried in dedicated signaling between the terminal and the LMF.

For technical effects achieved by the third aspect or the possible implementations of the third aspect, refer to the descriptions of the technical effects of the first aspect or the possible implementations of the first aspect. Details are not described herein again.

According to a fourth aspect, a communication apparatus is provided. For example, the communication apparatus is the terminal described above. The communication apparatus has a function of implementing a behavior in the method embodiment in the first aspect. The function may be implemented by hardware, or may be implemented by hardware by executing corresponding software. The hardware or the software includes one or more modules corresponding to the foregoing function. In a possible implementation, the communication apparatus includes, for example, a receiving module and a sending module that are coupled to each other, and may further include a processing module coupled to the receiving module and/or the sending module. These modules may perform corresponding functions in the method example in the first aspect. For details, refer to detailed descriptions in the method example.

For example, the communication apparatus has the function of implementing the behavior in the embodiment of the first aspect. In a possible implementation, the receiving module is configured to receive first indication information and a first message, where the first indication information indicates one or more positioning areas, and/or a plurality of cells included in each of the one or more positioning areas. The first message includes one or more pieces of resource configuration information, and each piece of resource configuration information is used to configure a reference signal resource. The reference signal resource is used by the communication apparatus to send a reference signal, and the reference signal is used to determine a location of the communication apparatus, and each piece of resource configuration information corresponds to one positioning area. The sending module is configured to send, in the positioning area indicated by the first indication information, the reference signal based on the resource configuration information corresponding to the positioning area.

In a possible implementation, after the communication apparatus is handed over from a first cell to a second cell, when determining that the second cell is in a first positioning area, the processing module determines to send the reference signal based on first resource configuration information corresponding to the first positioning area, where the first cell is in the first positioning area.

In a possible implementation, the receiving module is further configured to receive second indication information, where the second indication information indicates one or more positioning areas, and/or a plurality of cells included in each of the one or more positioning areas, and a priority of the second indication information is higher than a priority of the first indication information. The sending module is further configured to send, in the positioning area indicated by the second indication information, the reference signal based on resource configuration information corresponding to the positioning area.

In a possible implementation, the first indication information includes one or more positioning area indexes, and one positioning area index corresponds to one positioning area.

In a possible implementation, the first indication information includes one or more cell index lists, where one cell index list corresponds to one positioning area, and one cell index in one cell index list corresponds to one cell.

In a possible implementation, cell indexes included in different cell index lists are partially the same.

In a possible implementation, the processing module is configured to: after the communication apparatus is handed over from the first cell to the second cell, obtain a cell index of the second cell; and when determining that the cell index of the second cell is in a first cell index list, determine sending the reference signal based on first resource configuration information corresponding to the first cell index list; or when determining that the cell index of the second cell is in a second cell index list, obtain second resource configuration information corresponding to the second cell index list, and determine sending the reference signal based on the second resource configuration information, where a cell index of the first cell is in the first cell index list.

In a possible implementation, the first indication information further includes one or more reference signal resource indexes, and one reference signal resource index corresponds to one positioning area or one cell index list.

In a possible implementation, the processing module is configured to: after the communication apparatus is handed over from the first cell to the second cell, when determining that the second cell is in a third cell index list, determine a reference signal resource index corresponding to the third cell index list; and the sending module is configured to send the reference signal based on a reference signal resource corresponding to the reference signal resource index.

In a possible implementation, the sending module is further configured to send a second message, where the second message includes one or more of the following information: positioning precision information, battery capacity information of the terminal, or energy saving requirement information of the terminal.

In a possible implementation, the first indication information is determined based on the second message.

In a possible implementation, the first indication information is carried in a SIB, a Pos SIB, an RRC message, or an LPP message.

For technical effects achieved by the fourth aspect or the possible implementations of the fourth aspect, refer to the descriptions of the technical effects of the first aspect or the possible implementations of the first aspect.

According to a fifth aspect, a communication apparatus is provided. For example, the communication apparatus is the network device described above. The communication apparatus has a function of implementing a behavior in the method embodiment in the second aspect. The function may be implemented by hardware, or may be implemented by hardware by executing corresponding software. The hardware or the software includes one or more modules corresponding to the foregoing function. In a possible implementation, the communication apparatus includes, for example, a receiving module and a sending module that are coupled to each other, and may further include a processing module coupled to the receiving module and/or the sending module. These modules may perform corresponding functions in the method example in the second aspect. For details, refer to detailed descriptions in the method example.

For example, the communication apparatus has the function of implementing the behavior in the method embodiment of the second aspect. In a possible implementation, the sending module is configured to send first indication information and a first message, where the first indication information indicates one or more positioning areas, and/or a plurality of cells included in each of the one or more positioning areas, the first message includes one or more pieces of resource configuration information, where each piece of resource configuration information is used to configure a reference signal resource. The reference signal resource is used by a terminal to send a reference signal, the reference signal is used to determine a location of the terminal, and each piece of resource configuration information corresponds to one positioning area. The receiving module is configured to receive the reference signal. The processing module is configured to measure the reference signal to obtain a positioning measurement result, where the positioning measurement result is used to determine the location of the terminal. The sending module is further configured to send the positioning measurement result to a location management device function.

In a possible implementation, the sending module is further configured to send second indication information, where the second indication information indicates one or more positioning areas, and/or a plurality of cells included in each of the one or more positioning areas, and a priority of the second indication information is higher than a priority of the first indication information.

In a possible implementation, the first indication information includes one or more positioning area indexes, and one positioning area index corresponds to one positioning area.

In a possible implementation, the first indication information includes one or more cell index lists, one cell index list corresponds to one positioning area, and one cell index in one cell index list corresponds to one cell.

In a possible implementation, cell indexes included in different cell index lists are partially the same.

In a possible implementation, the first indication information further includes one or more reference signal resource indexes, and one reference signal resource index corresponds to one positioning area or one cell index list.

In a possible implementation, the receiving module is further configured to receive a second message, where the second message includes one or more of the following information: positioning precision information, battery capacity information of the terminal, or energy saving requirement information of the terminal.

In a possible implementation, the processing module is configured to determine the first indication information based on the second message.

In a possible implementation, the first indication information is carried in a SIB, a Pos SIB, or an RRC message.

For technical effects achieved by the fifth aspect or the possible implementations of the fifth aspect, refer to descriptions of technical effects achieved by the second aspect or the possible implementations of the second aspect.

According to a sixth aspect, a communication apparatus is provided. For example, the communication apparatus is the location management function described above. The communication apparatus has a function of implementing a behavior in the method embodiment in the third aspect. The function may be implemented by hardware, or may be implemented by hardware by executing corresponding software. The hardware or the software includes one or more modules corresponding to the foregoing function. In a possible implementation, the communication apparatus includes, for example, a receiving module and a sending module that are coupled to each other, and may further include a processing module coupled to the receiving module and/or the sending module. These modules may perform corresponding functions in the method example in the third aspect. For details, refer to detailed descriptions in the method example.

For example, the communication apparatus has the function of implementing the behavior in the method embodiment of the third aspect. In a possible implementation, the sending module is configured to send first indication information. The receiving module is configured to receive a positioning measurement result. The processing module is configured to determine a location of a terminal based on the positioning measurement result, where the first indication information indicates one or more positioning areas, and/or a plurality of cells included in each of the one or more positioning areas, and the positioning measurement result is obtained by performing measurement based on a reference signal sent by the terminal.

In a possible implementation, the receiving module is further configured to receive a second message, where the second message includes one or more of the following information: positioning precision information, battery capacity information of the terminal, or energy saving requirement information of the terminal.

In a possible implementation, the first indication information or the second message is carried in an LPP message, that is, carried in dedicated signaling between the terminal and the LMF.

For technical effects achieved by the sixth aspect or the possible implementations of the sixth aspect, refer to the descriptions of the technical effects achieved by the third aspect or the possible implementations of the third aspect.

According to a seventh aspect, a communication apparatus is provided. The communication apparatus may be the network device in the foregoing method embodiments or a chip disposed in the network device. Alternatively, the communication apparatus may be the location management device in the foregoing method embodiments or a chip disposed in the location management device. Alternatively, the communication apparatus may be the terminal in the foregoing method embodiments or a chip disposed in the terminal. The communication apparatus includes a communication interface and a processor, and optionally, further includes a memory. The memory is configured to store a computer program or instructions. The processor is coupled to the memory and the communication interface. When the processor executes the computer program or the instructions, the communication apparatus is enabled to perform the method performed by a corresponding function entity in the foregoing method embodiments. For example, when the processor executes the computer program or the instructions, the communication apparatus is enabled to perform the method performed by the network device in the foregoing method embodiments. For another example, when the processor executes the computer program or the instructions, the communication apparatus is enabled to perform the method performed by the location management device in the foregoing method embodiments. For example, when the processor executes the computer program or the instructions, the communication apparatus is enabled to perform the method performed by the terminal in the foregoing method embodiments.

The communication interface in the communication apparatus in the seventh aspect may be a transceiver in the communication apparatus, and is implemented, for example, by using an antenna, a feeder, and a codec in the communication apparatus. Alternatively, if the communication apparatus is a chip disposed in a communication apparatus, the communication interface may be an input/output interface of the chip, for example, an input/output pin.

According to an eighth aspect, a communication system is provided. The communication system includes any communication apparatus according to the fourth aspect, any communication apparatus according to the fifth aspect, and any communication apparatus according to the sixth aspect.

According to a ninth aspect, this application provides a chip system. The chip system includes a processor, configured to implement a function of the network device, the location management function, or the terminal in the methods in the foregoing aspects. In a possible design, the chip system further includes a memory, configured to store program instructions and/or data. The chip system may include a chip, or may include a chip and another discrete component.

According to a tenth aspect, a computer program product is provided. The computer program product includes computer program code, and when the computer program code is run, the method performed by the network device, the location management device, or the terminal in the foregoing aspects is performed.

According to an eleventh aspect, this application provides a computer-readable storage medium. The computer-readable storage medium stores a computer program. When the computer program is run, the method performed by the network device, the location management device, or the terminal in the foregoing aspects is implemented.

In embodiments of this application, the network device or the LMF may configure one or more positioning areas for the terminal. Each positioning area corresponds to one reference signal resource, and each positioning area includes a plurality of cells. In other words, a plurality of cells correspond to one reference signal resource. In this way, only when the terminal moves from one positioning area to another positioning area, a corresponding reference signal resource needs to be re-obtained to send a reference signal. Compared with conventional technologies in which one cell corresponds to one reference signal resource, that is, a reference signal resource needs to be re-obtained after handover from one cell to another cell, in embodiments of this application, the terminal does not need to obtain reference signal resource configuration information frequently. This can reduce energy consumption of the terminal.

DESCRIPTION OF EMBODIMENTS

Figure 1:
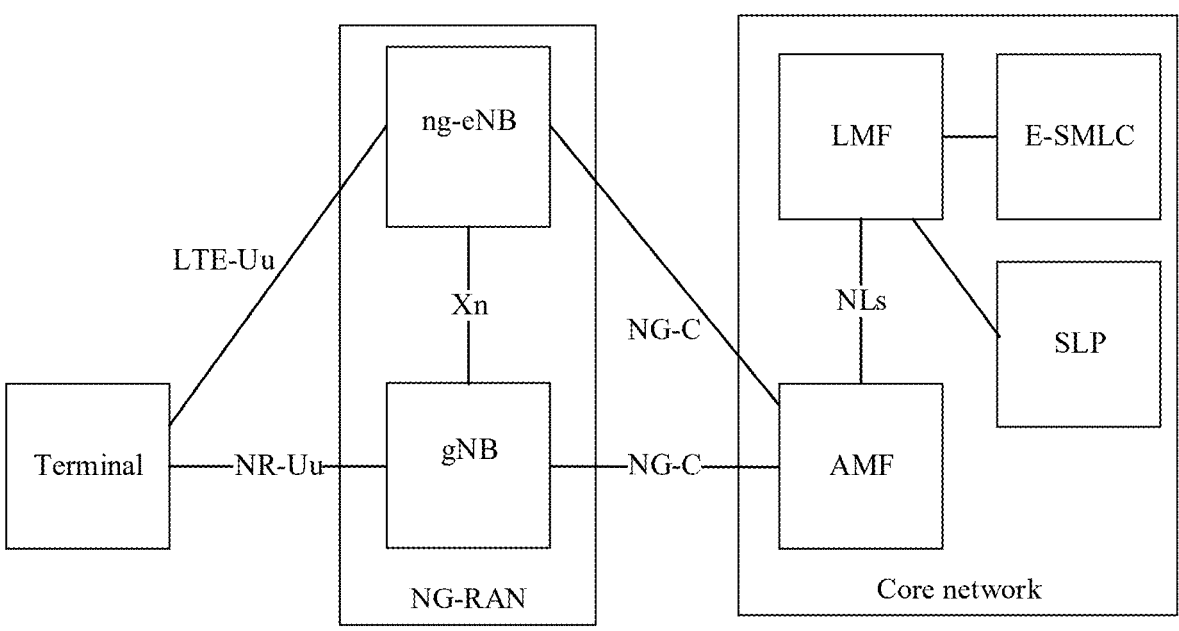
FIG. 1 is a schematic diagram of a positioning architecture in long term evolution (LTE) and new radio (NR) Rel-16.

To make objectives of the technical solution, and advantages of embodiments of this application clearer, the following description further describes embodiments of this application in detail with reference to the accompanying drawings.

Before the application is described, some terms in embodiments of this application are first briefly explained and described, to help a person skilled in the art have a better understanding.

(1) A terminal (also referred to as user equipment (UE)) in embodiments of this application is a device having a wireless transceiver function. The terminal device may communicate with a core network by using a radio access network (RAN), and exchange a voice and/or data with the RAN. The terminal device may be deployed on land, including an indoor or outdoor device, a handheld device, or a vehicle-mounted device; or may be deployed on water (for example, on a ship); or may be deployed in the air (for example, on an airplane, a balloon, or a satellite). The terminal device may be a mobile phone, a tablet computer (pad), a computer having a wireless transceiver function, a virtual reality (VR) terminal, an augmented reality (AR) terminal, a wireless terminal in industrial control, a wireless terminal in self-driving applications, a wireless terminal in telemedicine (e.g., remote medical), a wireless terminal in a smart grid, a wireless terminal in transportation safety, a wireless terminal in a smart city, a wireless terminal in a smart home, or the like. The terminal device may include, for example, UE, a wireless terminal device, a mobile terminal device, a device-to-device communication (D2D) terminal device, a vehicle-to-everything (V2X) terminal device, a machine-to-machine/machine type communication (M2M/MTC) terminal device, an internet of things (IoT) terminal device, a subscriber unit, a subscriber station, a mobile station, a remote station, an access point (AP), a remote terminal, customer premises equipment (CPE), fixed wireless access (FWA), an access terminal, a user terminal, a user agent, or a user device. For example, the terminal device may include a mobile phone (also referred to as a "cellular" phone), a computer with a mobile terminal device, or a portable, pocket-sized, handheld, or computer built-in mobile apparatus. For example, the terminal device may be a device such as a personal communication service (PCS) phone, a cordless telephone set, a session initiation protocol (SIP) phone, a wireless local loop (WLL) station, or a personal digital assistant (PDA). The terminal device may alternatively include a limited device, for example, a device with low power consumption, a device with a limited storage capability, or a device with a limited computing capability. For example, the terminal device includes an information sensing device such as a barcode, radio frequency identification (RFID), a sensor, a global positioning system (GPS), or a laser scanner.

By way of example and not as a limitation, in embodiments of this application, the terminal may alternatively be a wearable device. The wearable device may also be referred to as a wearable intelligent device, an intelligent wearable device, or the like, and is a general term for wearable devices that are intelligently designed and developed for daily wear by using a wearable technology, for example, glasses, gloves, watches, clothes, and shoes. The wearable device is a portable device that can be directly worn on the body or integrated into clothes or an accessory of a user. The wearable device is not only a hardware device, but also implements a powerful function through software support, data exchange, and cloud interaction. In a broad sense, wearable intelligent devices include full-featured and large-sized devices that can implement all or some of functions without depending on smartphones, for example, smart watches or smart glasses, and include devices that may only have one type of application function and need to collaboratively work with other devices such as smartphones, for example, various smart bands, smart helmets, or smart jewelry for monitoring physical signs.

However, if the various terminals described above are located on a vehicle (for example, placed in the vehicle or installed in the vehicle), the terminals may be considered as vehicle-mounted terminal devices. For example, the vehicle-mounted terminal devices are also referred to as on-board units (OBUs).

The terminal may establish a connection to a carrier network through an interface (for example, N1) provided by the carrier network, and use services such as a data service and/or a voice service provided by the carrier network. The terminal device may further access a data network (DN) through the carrier network, and use a carrier service deployed on the DN and/or a service provided by a third party. The third party may be a service provider other than the carrier network and the terminal device, and may provide other services such as a data service and/or a voice service for the terminal device. A form of the third party may be determined based on an actual application scenario, and is not limited herein.

(2) A core network in embodiments of this application may include a network device that processes and forwards signaling and data of a user. For example, core network devices such as an access and mobility management function (AMF), a session management function (SMF), a user plane gateway, and a location management device are included. The user plane gateway may be a server that has functions such as mobility management, routing, and forwarding specific to user plane data. The user plane gateway, for example, a serving gateway (SGW), a packet data network gateway (PGW), or a user plane network element functional entity (UPF), is generally located on a network side. The AMF and the SMF are equivalent to a mobility management entity (MME) in a long term evolution (LTE) system. The AMF is mainly responsible for admission, and the SMF is mainly responsible for session management. Certainly, the core network may also include other network elements, which are not all listed herein.

The location management device has a positioning function. The location management device in embodiments of this application may include a location management function (LMF) or a location management component (LMC), or may be a local location management function (LLMF) located in a network device. This is not limited in embodiments of this application. For ease of description, the following embodiments are described by using an example in which the location management device is an LMF.

(3) A network device in embodiments of this application includes, for example, an access network (AN) device. A next generation (NG)-RAN in embodiments of this application may include one or more access network devices. The access network device in the NG-RAN may also be referred to as a base station, a RAN node, or a RAN device. A network device in a V2X technology is a roadside unit (RSU). The RSU may be a fixed infrastructure entity that supports a V2X application, and may exchange messages with another entity that supports the V2X application. The network device is an entity that is on a network side and that is configured to transmit and/or receive a signal, and may be configured to perform mutual conversion between a received over-the-air frame and an internet protocol (IP) packet, and serve as a router between a terminal and a rest part of an access network. The rest part of the access network may include an internet protocol (IP) network or the like. The network device may further coordinate attribute management of an air interface. For example, the network device may be an evolved NodeB (eNB or e-NodeB) in LTE. The eNB is an apparatus that is deployed in a radio access network and that meets a fourth-generation (4G) standard and provides a wireless communication function for a terminal. The access network device may alternatively be a new radio controller (NR controller), a gNodeB (gNB) in a fifth-generation (5G) system, a central unit, a new radio base station, a radio remote module, a micro base station (also referred to as a small cell), a relay, a distributed unit, macro base stations in various forms, a transmission reception point (TRP), a transmission measurement function (TMF), a transmission point (TP), any other radio access device, or a base station in next generation communication. However, embodiments of this application are not limited thereto. The network device may alternatively include a radio network controller (RNC), a NodeB (NB), a base station controller (BSC), a base transceiver station (BTS), a home base station (for example, a home evolved NodeB, or a home NodeB, HNB), a baseband unit (BBU), a wireless fidelity (Wi-Fi) access point (AP), or the like.

In some deployments, a base station (for example, a gNB) may include a central unit (CU) and a distributed unit (DU). To be specific, functions of the base station in an original LTE access network are divided, some functions of the base station are deployed in one CU, remaining functions are deployed in DUs, and a plurality of DUs share the CU. This can reduce costs and facilitate network expansion. The CU and the DU may be split based on a protocol stack. An RRC layer, a service data adaptation protocol (SDAP) layer, and a packet data convergence protocol (PDCP) layer are deployed in the CU, and a radio link control (RLC) layer, a medium access control (MAC) layer, and a physical (PHY) layer are deployed in the DU. The CU and the DU may be connected through an F1 interface. The CU is connected to the core network through an NG interface on behalf of the gNB, and the CU is connected to another gNB through an Xn interface on behalf of the gNB.

Further, the CU may be further divided into a CU-control plane (CP) and a CU-user plane (UP). The CU-CP is responsible for a control plane function, and mainly includes the RRC layer and a PDCP layer corresponding to the control plane, namely, a PDCP-C layer. The PDCP-C layer is mainly responsible for data encryption and decryption, integrity protection, data transmission, and the like on the control plane. The CU-UP is responsible for a user plane function, and mainly includes the SDAP layer and a PDCP layer corresponding to the user plane, namely, a PDCP-U layer. The SDAP layer is mainly responsible for processing data of a core network and mapping a flow to a bearer. The PDCP-U layer is mainly responsible for encryption and decryption, integrity protection, header compression, serial number maintenance, data transmission, and the like on a data plane. The CU-CP is connected to the CU-UP through an E1 interface. On behalf of the gNB, the CU-CP is connected to the core network through the NG interface, and is connected to the DU through an F1 interface-control plane, namely, F1-C. The CU-UP is connected to the DU through an F1 interface-user plane, namely, F1-U. Certainly, in another possible implementation, the PDCP-C is implemented on the CU-UP.

(4) A user-centric positioning area (UCPA) may be a cell in which a user is currently located and one or more neighboring cells of the cell.

(5) An uplink angle of arrival (UAOA/UL-AOA) may be used to position a terminal. At least two network devices that participate in terminal positioning measure an SRS sent by the terminal, to obtain an AOA, and a location of the terminal may be determined based on an intersection point of rays transmitted by the network devices at the corresponding AOA.

(6) A time difference of arrival (TDOA) is a transmission time difference of signals sent by the terminal to two network devices, and may be used to position the terminal. Based on different measurement objects, a downlink time difference of arrival (DL-TDOA) and an uplink time difference of arrival (UL-TDOA) are used. In some embodiments, the DL-TDOA may also be referred to as a UTDOA, and the UL-TDOA may also be referred to as an observed time difference of arrival (OTDOA).

(7) Terms "system" and "network" may be used interchangeably in embodiments of this application. The term "a plurality of" means two or more than two. The term "and/or" describes an association relationship for describing associated objects and represents that three relationships may exist. For example, A and/or B may represent the following three cases: only A exists, both A and B exist, and only B exists. In addition, the character "/" generally indicates an "or" relationship between the associated objects.

At least one of the following items (pieces) or a similar expression thereof refers to any combination of these items, including any combination of singular items (pieces) or plural items (pieces). For example, at least one of a, b, or c may represent: a, b, c, a and b, a and c, b and c, or a, b, and c, where a, b, and c may be singular or plural.

In addition, unless otherwise stated, ordinal numbers such as "first" and "second" in embodiments of this application are for distinguishing between a plurality of objects, but are not intended to limit an order, a time sequence, priorities, or importance of the plurality of objects. For example, a first message and a second message are merely intended to distinguish between different messages, but do not indicate that the two messages are different in priorities, a sending sequence, or importance.

FIG. 1 is a schematic diagram of a positioning architecture in LTE and NR Rel-16. As shown in FIG. 1, involved network elements/modules mainly include three parts: a NG RAN, a terminal, and a core network.

The core network includes a LMF, an AMF, a service location protocol (SLP), an evolved serving mobile location center (E-SMLC), and the like. A location server, namely, the LMF, is connected to the AMF, and the LMF and the AMF are connected through an NLs interface. The LMF is responsible for supporting different types of location services related to the terminal, including positioning the terminal and transferring assistance data to the terminal. The AMF may receive a terminal-related location service request from a 5th generation core network location service (5GC LCS) entity, or the AMF may enable some location services on behalf of a specific terminal, and forward the location service request to the LMF. After obtaining location information returned by the terminal, the AMF returns the related location information to the 5GC LCS entity.

The NG RAN may include a gNB, a next generation evolved NodeB (ng-eNB), and the like. The gNB and the ng-eNB are connected through an Xn interface, and the LMF and the ng-eNB/gNB are connected through an NG-C interface.

One or more network devices on an NG RAN side configure, for the terminal, a resource used to send a reference signal, measure an uplink signal such as the reference signal from the terminal, and feed back a measurement result to the LMF to support positioning. It should be understood that the reference signal is used for positioning, and may also be referred to as a positioning reference signal. This disclosure focuses on uplink positioning. Therefore, the positioning reference signal may be an SRS, a preamble, or the like. In this disclosure, that the positioning reference signal is the SRS is used as an example. Generally, an SRS resource is configured based on a cell level, that is, an SRS resource is configured for each cell. As the terminal moves, the terminal may move from one cell (e.g., a current cell) to another cell (for example, referred to as a target cell). In this case, the terminal performs cell handover. In a cell handover process, an SRS resource configured by a serving base station for the current cell is released. After the terminal reestablishes a RRC connection to the target cell, the terminal obtains an SRS resource configured for the target cell, to send the SRS on the SRS resource.

Due to mobility of the terminal, in a positioning process, the terminal needs to obtain an SRS resource configuration frequently. As a result, power consumption of the terminal is increased, which results in the power consumption to be high. This is contrary to a requirement of the terminal to have low power consumption.

In view of this, in the solutions provided in embodiments of this application, a same SRS resource is configured for a plurality of cells in a specific area. If the terminal is located in the area, the terminal does not need to re-obtain an SRS resource configuration. In this way, a quantity of times that the terminal obtains the SRS resource configuration is reduced, thereby reducing power consumption of the terminal.

A positioning method provided in embodiments of this application may be applied to various communication systems, for example, a LTE system, a 5G system such as NR, and a next generation communication system such as a 6$^{th}$ generation (6G) system. Certainly, the technical solutions in embodiments of this application may also be applied to another communication system, provided that the communication system has a positioning requirement for a terminal. In addition, the communication system is further applicable to a future-oriented communication technology. The systems described in the embodiments of this application are intended to describe the technical solutions in embodiments of this application more clearly, and constitute no limitation on the technical solutions provided in embodiments of this application. A person of ordinary skill in the art may learn that, with an evolution of network architectures, the technical solutions provided in the embodiments of this application are also applicable to a similar technical problem.

Figure 2:
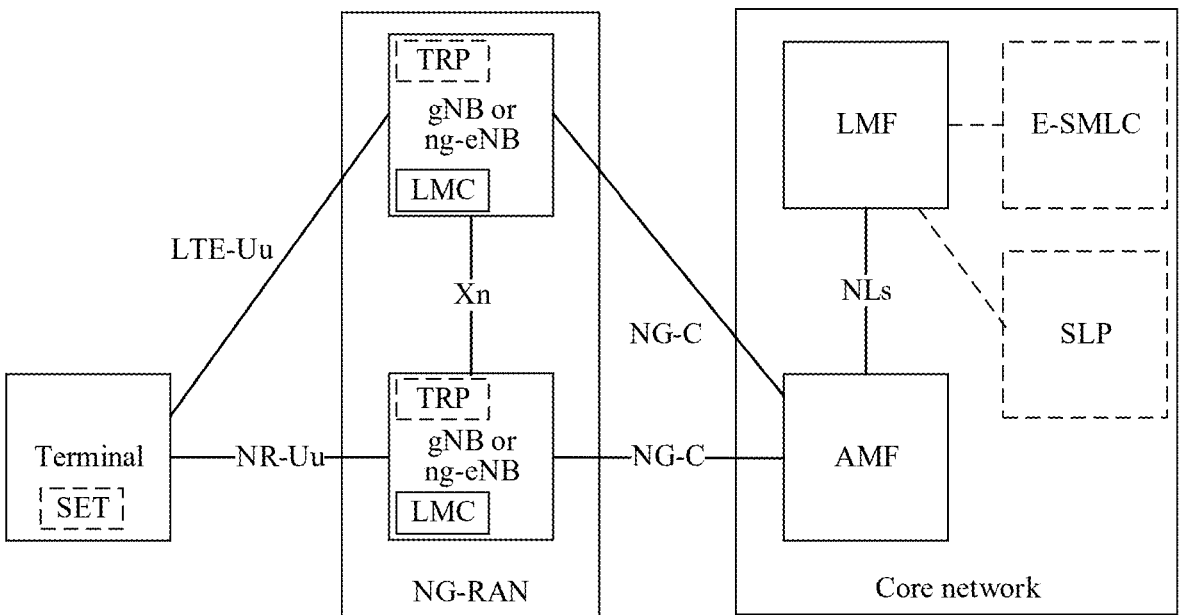
FIG. 2 is a diagram of a network architecture of a communication system to which an embodiment of this application is applicable.

FIG. 2 shows a network architecture of a communication system to which an embodiment of this application is applicable. The communication system includes a core network, an NG-RAN, and a terminal. The core network includes network elements/modules such as an LMF, an AMF, a secure user plane location (SUPL) location platform (SLP), and an enhanced serving mobile location center (E-SMLC). The NG RAN includes network elements/modules such as a gNB and an ng-eNB. Specific functions of the network elements/modules such as the LMF, the AMF, the SLP, the E-SMLC, the gNB, and the ng-eNB and connection relationships between the network elements/modules, refer to descriptions of related parts in FIG. 1 above, and details are not described herein again.

A difference from FIG. 1 lies in that, in the network architecture shown in FIG. 2, an LMC is added to the NG-RAN, and the LMC is disposed inside a base station, for example, disposed in the gNB or the ng-eNB. In this network architecture, the LMC serves as an internal function of the base station. Therefore, no new interface needs to be introduced.

Figure 3:
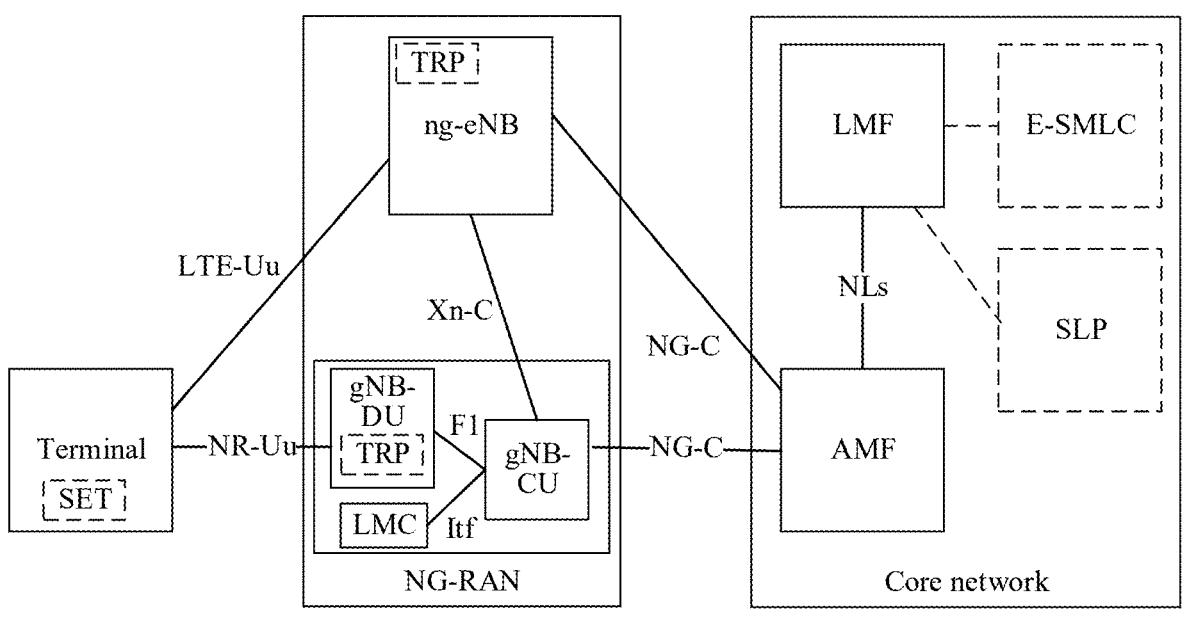
FIG. 3 is a diagram of a network architecture of another communication system to which an embodiment of this application is applicable.

FIG. 3 shows a network architecture of another communication system to which an embodiment of this application is applicable. As shown in FIG. 3, the communication system also includes a core network, an NG-RAN, and a terminal. A difference from FIG. 2 lies in that, an LMC in the network architecture shown in FIG. 3 serves as an independent logical node in the NG-RAN, and is connected to a base station through a new interface. For example, in FIG. 3, the LMC is connected to a gNB-CU through an interface Itf.

Figure 4:
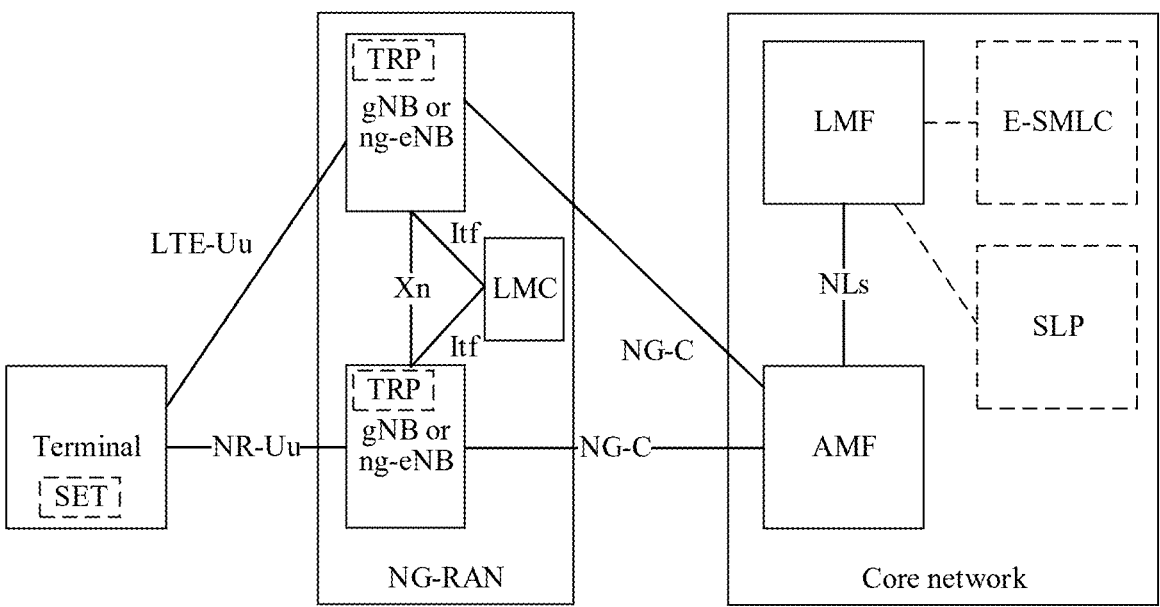
FIG. 4 is a diagram of a network architecture of still another communication system to which an embodiment of this application is applicable.

FIG. 4 shows a network architecture of another communication system to which an embodiment of this application is applicable. As shown in FIG. 4, the communication system also includes a core network, an NG-RAN, and a terminal. An LMC serves as an independent logical node in the NG-RAN. A difference from FIG. 3 lies in that, the LMC may be simultaneously connected to a plurality of base stations through a new interface in FIG. 4. In FIG. 4, an example in which the LMC is simultaneously connected to two base stations is used. In an implementation, the LMC may alternatively be connected to more base stations.

It should be understood that FIG. 1, FIG. 2, FIG. 3, and FIG. 4 are merely examples for describing the communication systems to which embodiments of this application are applicable, and do not limit types, quantities, connection manners, and the like of network elements included in the communication systems to which this application is applicable. In addition, network elements/modules shown by dashed lines in FIG. 2 to FIG. 4 are not essential, but are optional. For example, the E-SMLC or the SLP is not essential. Alternatively, a network element/module indicated by a dashed line is in another form. For example, the gNB or the ng-eNB is also referred to as a TRP in some embodiments, and the terminal is referred to as a SET in some embodiments.

It should be understood that the positioning method includes an OTDOA based positioning method, a DL-AOA based positioning method, a DL-AOD based positioning method, a UL-AOA based positioning method, a multi-round-trip time (RTT) based positioning method, and the like. In general, the methods may be summarized as an uplink positioning method, a downlink positioning method, and an uplink-downlink positioning method. It should be noted that, the terms "uplink" and "downlink" herein are relative. If a transmission direction from a base station to a terminal is a downlink direction (which is used as an example in this disclosure), a transmission direction from the terminal to the base station is an uplink direction. On the contrary, if the transmission direction from the base station to the terminal is the uplink direction, the transmission direction from the terminal to the base station is the downlink direction.

The following describes in detail the positioning method provided in embodiments of this application with reference to the accompanying drawings.

Figure 5:
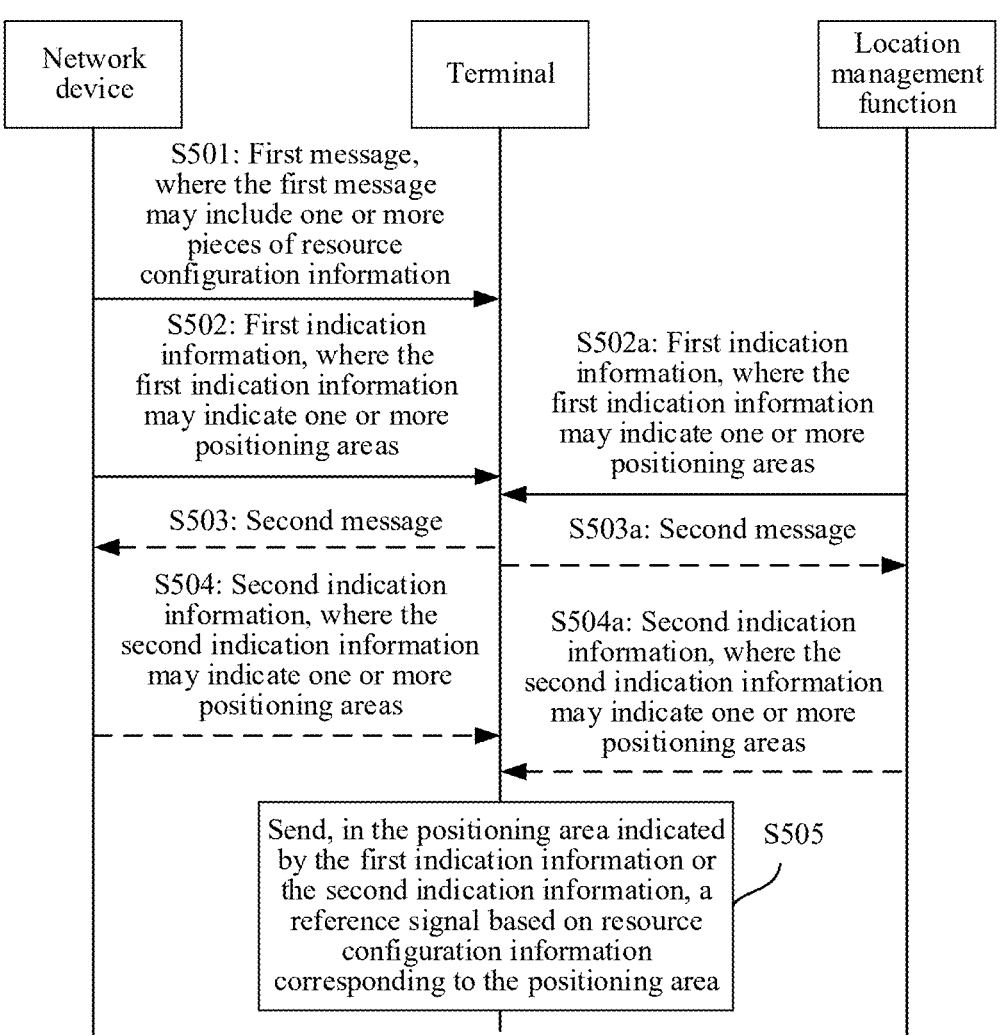
FIG. 5 is a schematic flowchart of an uplink positioning method according to an embodiment of this application.

FIG. 5 is a flowchart of an uplink positioning method according to an embodiment of this application. In the following descriptions, an example in which the method is applied to the communication systems shown in FIG. 2 to FIG. 4 is used. In addition, the method may be performed by three communication apparatuses. The three communication apparatuses are, for example, a first communication apparatus, a second communication apparatus, and a third communication apparatus. For ease of description, in the following, an example in which the method is performed by a network device, a terminal, and a location management device is used, that is, an example in which the first communication apparatus is the network device, the second communication apparatus is the terminal, and the third communication apparatus is the location management device is used. It should be noted that the communication systems in FIG. 2 to FIG. 4 are merely used as examples in some embodiments. A scenario is not limited thereto. It should be understood that there is one network device (where the network device may be referred to as a serving base station) currently accessed by the terminal. For ease of description, the network device is referred to as the serving base station below. An example in which the location management device is an LMF network element is used below. It should be understood that in future communication such as 6G, the location management device may still be an LMF network element or have another name. This is not limited in some embodiments.

Specifically, a procedure of the uplink positioning method provided in some embodiments is described as follows:

S501: The network device sends a first message to the terminal, and correspondingly, the terminal receives the first message, where the first message may include one or more pieces of resource configuration information, each piece of resource configuration information is used to configure a reference signal resource, the reference signal resource is used by the terminal to send a reference signal, and the reference signal is used to determine a location of the terminal.

S502: The network device sends first indication information to the terminal, and correspondingly, the terminal receives the first indication information, where the first indication information indicates one or more positioning areas.

In some embodiments, the network device may be a network device currently serving the terminal. The network device may be a device in an NG RAN, for example, a gNB or an ng-eNB. Alternatively, the network device may be an LMC. As described above, if the LMC serves as an internal function of the network device, the network device is a network device in which the LMC is located. If a deployment solution of the LMC is shown in FIG. 3 or FIG. 4, that is, the LMC serves as an independent logical node and is connected to one or more network devices through an interface, the network device is any network device connected to the LMC.

In an existing uplink positioning procedure, the network device configures, for the terminal, a resource (also referred to as an SRS resource) used to send an SRS, and the network device notifies the terminal of the SRS resource. The terminal may send the SRS on the SRS resource for subsequent positioning. However, currently, an SRS resource is configured based on a cell level, that is, an SRS resource is configured for each cell. As the terminal moves, the terminal may move from one cell (e.g., a current cell) to another cell (for example, referred to as a target cell). In this case, the terminal performs a cell handover. In a cell handover process, an SRS resource that is configured by the serving base station for the current cell is released. After the terminal reestablishes an RRC connection to the target cell, the terminal obtains an SRS resource configured for the target cell to send the SRS on the SRS resource. Due to a mobility of the terminal, in the positioning process, the terminal needs to obtain an SRS resource configuration frequently. As a result, power consumption of the terminal is increased, and the power consumption is high.

Therefore, in some embodiments, the cell in which the terminal is located and a plurality of neighboring cells may be considered as one virtual cell, and one virtual cell corresponds to one SRS resource. In this way, when the terminal moves in a virtual cell, the terminal may send the SRS by using the obtained SRS resource, that is, when the terminal is handed over between cells, the terminal does not need to re-obtain an SRS resource. The terminal re-obtains an SRS resource only when the terminal is handed over from one virtual cell to another virtual cell. This results in reduced SRS resource steps which reduces power consumption of the terminal. The virtual cell is a reference area for positioning in this disclosure, and therefore is referred to as a positioning area in this disclosure. That is, a plurality of cells as may be considered as one positioning area in some embodiments.

In some embodiments, the first indication information may directly or indirectly indicate the one or more positioning areas, that is, the network device may configure the one or more positioning areas for the terminal. The first message may include the one or more pieces of resource configuration information, and each piece of resource configuration information is used to configure the SRS resource. Each positioning area corresponds to each piece of resource configuration information, that is, each positioning area corresponds to one SRS resource. When being handed over from one cell to another cell, the terminal may send the SRS based on the first indication information and the first message. For example, when the terminal is handed over from the first cell to the second cell, whether the terminal is handed over from one positioning area to another positioning area may be determined, to send the SRS based on an SRS resource corresponding to a positioning area in which the terminal is currently located.

It should be understood that each positioning area includes a plurality of cells. In some embodiments, the first indication information may indicate a plurality of cells included in each of the one or more positioning areas, that is, the plurality of positioning areas are indicated by indicating the plurality of cells included in each positioning area. For example, the first indication information may carry one or more cell index lists, each cell index list corresponds to one positioning area, and one cell index included in each cell index list corresponds to one cell. For example, each cell index may be a physical cell identifier (PCI), a cell global identifier (CGI), or the like. If the cell index is the PCI, when the terminal is handed over from one cell (for example, the first cell) to another cell (for example, the second cell), a PCI of the second cell may be obtained. For example, an SSB of the second cell is detected to identify the PCI of the second cell, and a cell index list that the PCI is in is determined, so that a positioning area in which the terminal is currently located may be directly determined. In addition, the first indication information further includes one or more absolute radio frequency channel numbers (ARFCNs). Each cell index in each cell index list has a corresponding ARFCN for indicating a frequency of the cell. One cell index list may include one or more ARFCNs. One ARFCN may correspond to one or more cell indexes. Alternatively, one cell index list includes one or more cell indexes, and one cell index corresponds to one ARFCN.

Considering that different cells may correspond to a same PCI, in some embodiments, to more accurately determine the second cell in which the terminal is currently located, the cell index may be configured as a CGI. In this case, when the terminal is handed over to the second cell, a SIB of the second cell may be read to identify a CGI of the second cell, and a cell index list that the CGI is in is determined, so that the positioning area in which the terminal is currently located is directly determined.

In some other embodiments, the first indication information indicates the one or more positioning areas. For example, the first indication information may carry one or more positioning area indexes. An application of this scenario is straightforward. The index may be, for example, an identity (ID). In this case, a correspondence between a positioning area and a plurality of cells may be predefined. For example, a correspondence between a positioning area index and a cell index list may be predefined. For the terminal, when the terminal is handed over from the first cell to the second cell, an index, for example, the PCI or the CGI, of the second cell may be obtained, and a cell index list that the index is in may be determined, so that positioning area in which the terminal is located is determined based on the correspondence between the cell index list and the positioning area index. In this embodiment, because the first indication information carries the one or more positioning area indexes, that is, carries a small amount of information, signaling overheads can be reduced.

It should be understood that, if a positioning precision requirement is low, each positioning area includes a small quantity of cells. If a positioning precision requirement is high, each positioning area includes a large quantity of cells. In a possible scenario, for example, for a campus (e.g., defined area), in an initially defined correspondence between a positioning area index and a cell index list, each positioning area corresponds to a small quantity of cells, to be applicable to a scenario with a low positioning precision requirement, for example, positioning of a user in the campus. However, there may be a scenario with a high positioning precision requirement in the campus. For example, for an industrial operation scenario, a robot needs to be accurately located to determine whether the robot accurately reaches an operation console. In this case, the initially defined correspondence between the positioning area index and the cell index list may be updated, to implement precise positioning. That is, in some other embodiments, the first indication information may include one or more positioning area indexes and a cell index list corresponding to each of the one or more positioning areas. In this embodiment, the correspondence between each positioning area and the cell index list may not be unique, and the correspondence between each positioning area and the cell index list may be determined based on an actual positioning requirement. This provides flexibility in applying whether high or low positioning precision is required.

In some embodiments, different cell index lists include different cell indexes, that is, different positioning areas include different cells. In some other embodiments, cell indexes included in different cell index lists are partially the same, that is, different positioning areas may include a same cell, to ensure that the terminal can save energy to its greatest extent or improve positioning precision of the terminal. It should be understood that positioning performed when the terminal is located in the center of a coverage area of the network device is more accurate than that performed when the terminal is located at an edge of the coverage area of the network device. For example, positioning accuracy is poor when the terminal is located at the edge of the coverage area of the network device or when the terminal is located at a periphery of the coverage area of the network device. If the terminal moves to an edge of a positioning area, but a network device on which the terminal camps (e.g., located) is exactly located in another positioning area, the terminal sends the SRS on an SRS resource corresponding to the another positioning area to ensure positioning precision of the terminal. It should be understood that a movement area of the terminal may change according to time, and a movement area (detected as a first area) in a current time period and a movement area (referred to as a second area for short) in a next time period partially overlap. It is assumed that the first area corresponds to one positioning area, and the second area corresponds to another positioning area. When the terminal moves to the second area, and the terminal is exactly in an area that is in the second area and that overlaps the first area, if the terminal switches to an SRS resource of a positioning area corresponding to the second area, unnecessary SRS resource switching and reporting can be avoided, to ensure continuity of a location service.

It should be understood that the network device may configure an SRS resource for the terminal. In some embodiments, the network device may configure one SRS resource for one positioning area. In some embodiments, the first message may include each piece of resource configuration information for configuring one SRS resource. The first indication information may further include SRS resource information, for example, an SRS resource index. In this case, the terminal sends the SRS on the SRS resource. When the terminal is handed over from one positioning area to another positioning area, the terminal needs to re-obtain an SRS resource of a new cell to which the terminal is handed over, and send the SRS on the SRS resource. That is, the terminal performs a necessary step of obtaining the SRS resource of the new cell, for example, a step of interacting with the network device. Then, the terminal sends the SRS on the newly obtained SRS resource. Certainly, if the network device configures one SRS resource for the terminal, the first indication information may not carry an SRS resource index, because the terminal may learn of the SRS resource based on the first message.

In some other embodiments, the first message may include a plurality of pieces of resource configuration information for configuring SRS resources corresponding to the plurality of positioning areas. For example, the first indication information may further include a plurality of pieces of SRS resource information, for example, a plurality of SRS resource indexes. It should be understood that one SRS resource index corresponds to one positioning area or one cell index list. When the terminal is handed over from one positioning area to another positioning area, the terminal may directly send the SRS on an SRS resource corresponding to the another positioning area. In other words, there is no need to re-obtain an SRS resource of a new cell to which the terminal is handed over, that is, there is no need to perform some steps of obtaining the SRS resource of the new cell to simplify a procedure. In this case, the terminal determines the another positioning area (e.g., a cell index list) and a corresponding SRS resource index, and may send an index (the cell index list) of the positioning area and the corresponding SRS resource index to the LMF. In this way, the LMF can learn in a timely manner that the terminal has switched the SRS resource, so that the SRS resource to which the terminal switches may be updated to the network device. In this way, the terminal may avoid unnecessary SRS resource switching and reporting, and ensure continuity of the location service.

That the terminal sends the SRS based on the first indication information and the first message is described later in this disclosure.

It should be noted that, an execution sequence of S501 and S502 is not limited in some embodiments, and S501 may be performed before S502, or S502 may be performed before S501, or S501 and S502 are simultaneously performed.

The first indication information may be implemented in a plurality of implementations. In an implementation of the first indication information, the first indication information may be carried in a SIB. The network device sends the SIB in a broadcast manner, and the terminal may periodically read the SIB to obtain the first indication information. It should be understood that this implementation is compatible with a procedure in which an existing network device sends a SIB, and no additional session needs to be established. In addition, the terminal in an RRC_Inactive state may receive the SIB, that is, the terminal in the RRC_Inactive state can also obtain the first indication information. Certainly, the first indication information may be carried in an existing field of the SIB or a newly defined field. This is not limited in some embodiments.

In another implementation of the first indication information, the first indication information may be carried in a Pos SIB. Similarly, the network device sends the Pos SIB in a broadcast manner, and the terminal may periodically read the Pos SIB to obtain the first indication information. It should be understood that this manner is compatible with a procedure in which an existing network device sends a Pos, and no additional session needs to be established. In addition, the terminal in an RRC_Inactive state may also receive the Pos SIB, that is, the terminal in the RRC_Inactive state can also obtain the first indication information. Certainly, the first indication information may be carried in an existing field of the Pos SIB or a newly defined field. This is not limited in some embodiments.

In still another implementation of the first indication information, the first indication information may be carried in a RRC message. In this manner, when having a positioning requirement, the terminal may request the network device to configure one or more positioning areas for the terminal, and the network device may configure the positioning area for the terminal based on the request of the terminal. The RRC message may also be considered as a response message sent to the request of the terminal. The terminal may receive the response message, that is, the terminal does not need to periodically read information such as a SIB. This reduces energy consumption of the terminal.

It should be noted that in S502, an example in which the network device sends the first indication information to the terminal is used. In a possible implementation, the first indication information may alternatively be sent by the LMF to the terminal. That is, the LMF may perform S502a in FIG. 5. If the first indication information is sent by the LMF to the terminal, the first indication information may be carried in LPP signaling.

Similarly, the first message may be carried in the SIB, the Pos SIB, the RRC message, or the LPP signaling. This is not limited in some embodiments.

As described above, the network device sends the first indication information to the terminal in the broadcasted manner. For each terminal, positioning areas configured by the network device for terminals are the same. However, in consideration of an actual situation, for example, different requirements such as positioning precision requirements of the terminals or energy consumption of the terminals, the network device may configure a dedicated positioning area for each terminal. For example, a first terminal and a second terminal exist. The network device may configure one or more positioning areas for the first terminal, but the one or more positioning areas belong to the first terminal instead of the second terminal.

It should be understood that if there are a plurality of terminals, and when none of the terminals have a special requirement that exists in the plurality of terminals, the network device may configure a same positioning area for the plurality of terminals. If a terminal having a special requirement exists in the plurality of terminals, the network device may configure a dedicated positioning area for that terminal, and configure a same positioning area for remainder of the plurality of terminals. Before the network device configures the dedicated positioning area for the terminal having a special requirement, the terminal may notify the network device of some information about the terminal, for reference when the network device configures the positioning area for the terminal.

S503: The terminal sends a second message to the network device, and correspondingly, the network device receives the second message.

The second message may include one or more pieces of characteristic information of the terminal. For example, the second message may include one or more of a positioning precision requirement of the terminal, battery capacity information of the terminal, or energy saving requirement information of the terminal, or other possible information. This is not limited in some embodiments. In some embodiments, the positioning precision requirement of the terminal may be represented by a precision level, for example, a meter level, a decimeter level, or a centimeter level. The battery capacity information of the terminal may be represented by a battery capacity percentage of the terminal, for example, 60%. If the battery capacity percentage of the terminal is small, a battery margin is small. The energy saving requirement information of the terminal may be quantified and represented by a numerical value. For example, a percentage is used for representation. 100% indicates a highest energy saving requirement, and 0% indicates a lowest energy saving requirement; and vice versa. For another example, a numerical value is used for representation. 1 indicates a highest energy saving requirement, and 0 indicates a lowest energy saving requirement; and vice versa. Certainly, this is merely an example, and a manner in which the energy saving requirement of the terminal is presented is not limited in some embodiments.

In some embodiments, the second message may be an RRC message, that is, the terminal notifies the network device of the positioning precision requirement of the terminal, the battery capacity information of the terminal, the energy saving requirement information of the terminal, and the like by using RRC signaling.

S504: The network device sends second indication information to the terminal, and correspondingly, the terminal receives the second indication information.

After receiving the second message from the terminal, the network device may determine the second indication information based on the second message sent by the terminal, that is, configure a dedicated positioning area for the terminal based on the second message. Similar to the second message, the second indication information may be carried in an RRC message, or may also be referred to as an RRC message. The second message may also be considered as a message for requesting a positioning area from the network device, and may be referred to as a positioning area request message. Correspondingly, the second indication information may be considered as a response message of the second message, that is, a positioning area response message. Certainly, when the second message is the positioning area request message, the network device may alternatively send a failure response message of the positioning area request message to the terminal to indicate that the network device configures no dedicated positioning area for the terminal.

That is, similar to the first indication information, the second indication information may indicate one or more positioning areas. For example, the second indication information may include one or more positioning area indexes. Alternatively, the second indication information may indicate a plurality of cells included in each positioning area. For example, the second indication information may include one or more cell index lists. Alternatively, the second indication information may include one or more positioning area indexes and a cell index list corresponding to each positioning area. An implementation of the second indication information may be the same as that of the first indication information. For details, refer to the implementation of the first indication information. Details are not described herein again.

A difference from the first indication information lies in that, because the second indication information is used to configure the dedicated positioning area for the terminal, it may be considered that a priority of the second indication information is higher than that of the first indication information. For a terminal, if the terminal receives the first indication information and the second indication information, the terminal may consider that the second indication information is valid, and the first indication information is invalid, that is, ignore the first indication information, and send, in the positioning area indicated by the second indication information, the SRS based on resource configuration information corresponding to the positioning area.

It should be noted that a system may consider by default that the priority of the second indication information is higher than the priority of the first indication information. However, in some scenarios, although the terminal receives the first indication information and the second indication information from the network device, the terminal may ignore the second indication information, and send the SRS based on the first indication information. For example, the network device further notifies the terminal that the second indication information is invalid.

In S503, an example in which the terminal sends the second message to the network device, and the network device configures the dedicated positioning area for the terminal by using the second indication information is used. In some embodiments, the LMF may alternatively configure a dedicated positioning area for the terminal. In this case, the terminal may send the second message to the LMF, that is, the terminal performs S503a in FIG. 5. It should be understood that the second message may be an LPP message. The LMF may perform S504a, that is, the LMF may send the second indication information to the terminal, where second indication information may be carried in the LPP message.

It should be noted that S503, S504, S503a, and S504a are not mandatory steps, and therefore are illustrated by dashed lines in FIG. 5. S503 may be performed before S501 or S502. This is not limited in some embodiments. In a possible implementation, if S503 is performed before S502, the network device may alternatively determine the first indication information based on the second message. Certainly, S504 may be performed before S501 or S502. Similarly, S503a and S504a may be performed before S502a, or may be performed after S502a.

S505: The terminal sends, in the positioning area indicated by the first indication information or the second indication information, the SRS based on an SRS resource corresponding to the positioning area.

If the terminal receives the first indication information, the terminal may send the SRS based on the first indication information and the first message. If the terminal receives the first indication information and the second indication information, the terminal may send the SRS based on the second indication information and the first message. The following separately describes how the terminal sends the SRS based on the first indication information or the second indication information.

The terminal reads the first message, and may determine one or more SRS resources configured by the network device for the terminal. The terminal periodically reads the SIB or the Pos SIB to obtain the first indication information, and may determine the one or more positioning areas configured by the network device for the terminal. Further, the terminal may determine the first indication information to determine the SRS resource, configured by the network device for each positioning area, to send the SRS on the SRS resource. It should be understood that, due to a mobility of the terminal, the terminal moves from one cell to another cell. This may cause the terminal to move from one positioning area to another positioning area. In some embodiments, only when the terminal moves from one positioning area to another positioning area, the terminal re-determines an SRS resource corresponding to the another positioning area, and sends the SRS on the SRS resource. Compared with a solution in which when the terminal moves from one cell to another cell, an SRS resource for the another cell needs to be re-obtained, this solution can simplify a positioning procedure and reduce energy consumption of the terminal.

For example, the first indication information indicates the one or more positioning areas. For example, the first indication information includes the one or more positioning area indexes. The terminal receives the first indication information, and may determine, for example, the one or more positioning areas configured by the network device for the terminal. If the terminal is currently located in a first positioning area, after the terminal is handed over from a cell in which the terminal is currently located, for example, the first cell to the second cell, the terminal may detect the SSB of the second cell, identify the PCI of the second cell, and determine, based on the PCI of the second cell, whether the second cell is in the first positioning area. If the PCI of the second cell is in a cell index list corresponding to the first positioning area, the second cell is in the first positioning area. Then, the terminal may send the SRS by still using an obtained SRS resource, that is, an SRS resource corresponding to the first positioning area. If the PCI of the second cell is not in a cell index list corresponding to the first positioning area, that is, the second cell is not in the first positioning area, for example the second cell is in a second positioning area, the terminal may release a currently obtained SRS resource, and obtain second resource configuration information corresponding to the second positioning area. That is, the terminal obtains a new SRS resource in the second cell, as an SRS resource corresponding to the second positioning area and sends the SRS on the SRS resource.

In an alternative implementation, the terminal is handed over from the first cell to the second cell, and the terminal may read the SIB of the second cell to identify the CGI of the second cell. If the CGI of the second cell is in a cell index list corresponding to a first positioning area, then the second cell is in the first positioning area, and the terminal sends the SRS by still using an obtained SRS resource, that is, an SRS resource of the second cell does not need to be re-obtained. This simplifies a positioning procedure and reduces energy consumption of the terminal. If the CGI of the second cell is in a cell index list corresponding to a second positioning area, that is, the second cell is in the second positioning area, the terminal may then release a currently obtained SRS resource and obtain a new SRS resource in the second cell as an SRS resource corresponding to the second positioning area and send the SRS on the SRS resource.

It should be understood that, an example in which the first indication information includes the one or more positioning area indexes is used. If the first indication information includes the one or more cell index lists, when the terminal moves from the first cell to the second cell, a cell index, for example, the PCI or the CGI, of the second cell is obtained, and whether the cell index of the second cell is in a first cell index list that includes a cell index of the first cell may be determined. If the cell index of the second cell is in the first cell index list, the terminal sends the SRS based on first resource configuration information corresponding to the first cell index list, that is, the terminal sends the SRS by still using the obtained SRS resource. If the cell index of the second cell is in a second cell index list, the terminal releases the currently obtained SRS resource, obtains second resource configuration information corresponding to the second cell index list, and sends the SRS based on the second resource configuration information. That is, the terminal obtains a new SRS resource in the second cell, as an SRS resource corresponding to the second positioning area, and sends the SRS on the SRS resource.

It should be noted that if the first indication information further includes the plurality of pieces of SRS resource configuration information, that is, the network device configures the corresponding SRS resource for each positioning area, the terminal determines that the second cell is in the second positioning area, and the terminal may send the SRS on the SRS resource corresponding to the second positioning area. That is, the terminal does not need to re-obtain an SRS resource in the second cell. This can further simplify a positioning procedure and reduce energy consumption of the terminal.

For example, if the terminal is handed over from the first cell to the second cell, and the terminal determines that the cell index of the second cell is, for example, in a third cell index list, the terminal may determine an SRS resource index corresponding to the third cell index list, and send the SRS on an SRS resource corresponding to the SRS resource index. Similarly, if the terminal determines that the second cell is in, for example, a third positioning area, the terminal determines an SRS resource index corresponding to the third positioning area, and sends the SRS on an SRS resource corresponding to the SRS resource index.

It should be understood that if the terminal further receives the second indication information, the terminal sends, in the positioning area indicated by the second indication information, the SRS based on the resource configuration information corresponding to the positioning area. A procedure in which the terminal sends the SRS based on the second indication information may be the same as that in which the terminal sends the SRS based on the first indication information. For details, refer to the foregoing procedure in which the terminal sends the SRS based on the first indication information. Details are not described herein again.

Further, when the terminal is handed over from one positioning area (for example, the first positioning area) to another positioning area (for example, the second positioning area), the terminal may send a second positioning area index and/or an SRS resource index corresponding to the second positioning area to the LMF or the network device. In this way, the LMF or the network device can learn in a timely manner that the terminal has switched its SRS resource and to update the SRS resource in a timely manner. This avoids unnecessary SRS resource switching and reporting, to ensure continuity of the location service. In addition for the terminal in the RRC inactive state, the terminal may notify, by using RRC signaling, the network device on which the terminal camps of the updated second positioning area of the terminal and the corresponding SRS resource. This helps the LMF or the network device learn that the SRS resource of the first positioning area has been released, so that the SRS resource of the first positioning area may be allocated to another terminal, to improve resource utilization.

The terminal notifies the network device or the LMF of the updated positioning area of the terminal and the corresponding SRS resource, and the network device or the LMF updates the positioning area of the terminal and the corresponding SRS resource. This may include the following steps.

(1) The terminal may send positioning area update information to the network device or the LMF by using an RRC connection resume request (e.g., RRC resume request) message, an RRC reconfiguration message, or an RRC message. The positioning area update information may indicate the updated positioning area of the terminal and the corresponding SRS resource. It is assumed that the updated positioning area of the terminal is the second positioning area corresponding to the second cell index list. The positioning area update information may include one or more of the following information: the second positioning area index, the second cell index list, or the SRS resource index corresponding to the second positioning area (or the second cell index list).

(2) The network device may request context data of the terminal from a network device that finally serves the terminal (which is referred to as a last network device for short).

(3) The last network device (a last serving gNB) feeds back the context data of the terminal to the network device.

(4) The network device requests an AMF to switch a service channel.

(5) The AMF returns a service channel switching response to the network device.

(6) The network device triggers the last network device to release a context of the terminal.

(7) The network device sends positioning area update information of the terminal to the LMF.

It should be understood that the positioning area update information needs to indicate a terminal to which the positioning area update information belongs. Therefore, the positioning area update information includes one or more of the second positioning area index, the second cell index list, and the SRS resource index corresponding to the second positioning area (or the second cell index list) in step (1), and the positioning area update information further includes information indicating the terminal and/or a current measurement task, so that the LMF learns whether the current measurement task is changed. For example, the positioning area update information may further include an identifier (e.g., index) of the terminal and/or a measurement identifier (e.g., index) indicating the measurement task, where the measurement identifier may alternatively be an NRPPa message index.

After receiving the positioning area update message, the LMF may determine that the SRS resource that is of the first positioning area and that is previously allocated to the terminal is released, and may indicate the network device to allocate the SRS resource to another terminal, to improve resource utilization.

Figure 6:
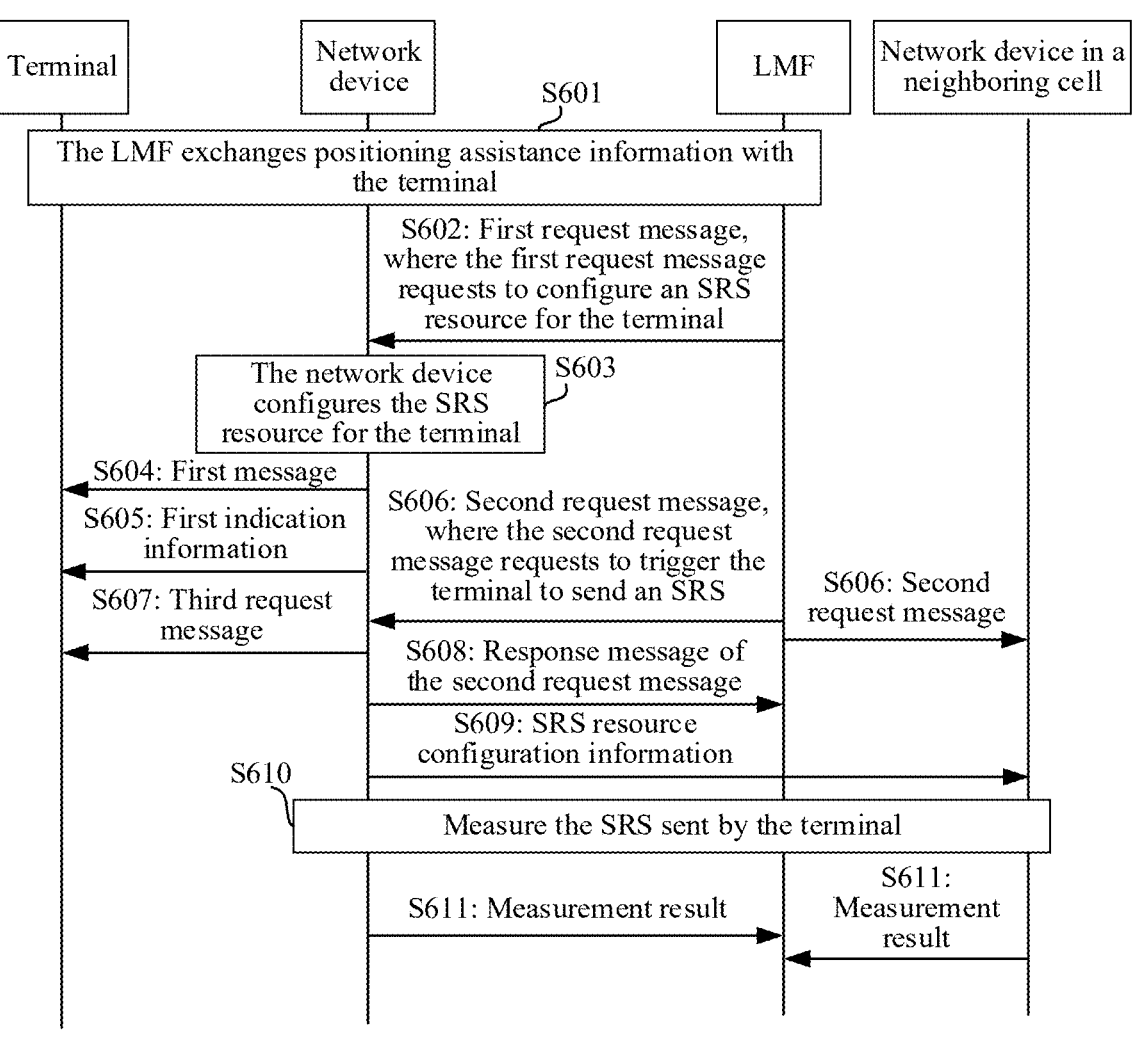
FIG. 6 is an example schematic flowchart of an uplink positioning method according to an embodiment of this application.

FIG. 6 is an example flowchart of an uplink positioning method according to an embodiment of this application. In FIG. 6, TDOA based positioning is used as an example. A positioning procedure is described as follows:

S601: A terminal exchanges positioning assistance information with an LMF.

A procedure in which the LMF exchanges the positioning assistance information with the terminal may be similar to a procedure in which the terminal exchanges information with the LMF by using LPP information in an OTDOA based positioning procedure. That is, the terminal requests the positioning assistance information from the LMF, the LMF sends the assistance information and the like to the terminal by using LPP provide assistance data. Details are not described herein again. The positioning assistance information may include an index of a cell that needs to be measured by the terminal, for example, a cell index of a neighboring cell and/or a cell index of a reference cell, and may further include an SRS configuration and the like.

The procedure in which the terminal exchanges the positioning assistance information with the LMF may further include that the LMF obtains a positioning capability of the terminal. For example, the LMF requests the positioning capability from the terminal, the LMF requests the positioning capability of the terminal through an LPP request capability process, or the terminal reports positioning capability information to the LMF by using an LPP provide capability. The positioning capability information may include a positioning method supported by the terminal, a measurement capability corresponding to the positioning method supported by the terminal, and the like. Alternatively, the positioning capability information may include one or more pieces of information included in the foregoing second message. That is, the foregoing second message may be a response message of a positioning capability request message sent by the LMF to the terminal.

S602: The LMF sends a first request message to a network device, where the first request message requests to configure an SRS resource for the terminal.

When the LMF needs to position the terminal, the LMF may request the network device (a serving base station) to configure the SRS resource for the terminal. SRS configurations of different cells may be different. In some embodiments, the LMF may notify the terminal of an SRS configuration of each cell.

S603: The network device configures the SRS resource for the terminal.

After receiving the request of the LMF, the network device may determine an available SRS resource, and configure the SRS resource for the terminal. In some embodiments, the network device may configure one SRS resource for the terminal for each of a plurality of positioning areas. Compared with conventional technologies in which one SRS resource is configured for each cell, this solution can simplify a positioning procedure and reduce energy consumption of the terminal.

It should be understood that the network device configures the SRS resource for the terminal at a positioning area granularity. In this case, after receiving the first request message, the network device may configure one or more positioning areas for the terminal, and configure one SRS resource for each positioning area. Then, the network device may notify the terminal or the LMF of the SRS resource configured for the terminal.

S604: The network device sends a first message to the terminal.

After configuring the SRS resource for the terminal, the network device may notify the terminal. For example, the network device may send the first message to the terminal. The first message may include one or more pieces of resource configuration information, and each piece of resource configuration information indicates one SRS resource.

In some embodiments, the network device may alternatively send the first message to the LMF, to notify the LMF of the SRS resource configured by the network device for the terminal.

S605: The network device sends first indication information to the terminal.

After configuring the SRS resource for the terminal, the network device may notify the terminal. For example, the network device may send the first indication information to the terminal, where the first indication information may indicate one or more positioning areas. In some embodiments, the network device notifies the LMF of the SRS resource configured by the network device for the terminal.

The LMF may alternatively send the first indication information to the terminal. That is, the LMF may configure one or more positioning areas for the terminal.

For the terminal, when the terminal camps on a cell, the terminal may determine an SRS resource of the cell on which the terminal camps, that is, an SRS resource of a positioning area in which the terminal is currently located. When the terminal is handed over from the positioning area in which the terminal is currently located to another positioning area, the terminal may obtain an SRS resource in a new cell to which the terminal is handed over, as an SRS resource for the another positioning area.

In some embodiments, the first indication information may further include one or more SRS resource indexes, and one SRS resource index corresponds to one positioning area, and indicates an SRS resource corresponding to the positioning area. In this case, when the terminal is handed over from one positioning area to another positioning area, the terminal does not need to obtain an SRS resource in a new cell.

It should be understood that the first indication information may be determined based on characteristic information of the terminal, that is, determined based on the foregoing second message. In this case, the terminal may send the second message to the network device.

Certainly, the network device may alternatively configure a dedicated positioning area for the terminal based on the second message, that is, the network device may further send second indication information to the terminal. For implementations of the first indication information and the second indication information, refer to the descriptions in the foregoing embodiments. Details are not described herein again.

S606: The LMF sends a second request message to the network device, where the second request message requests the network device to trigger the terminal to send an SRS.

S607: The network device sends a third request message to the terminal, where the third request message triggers the terminal to send the SRS.

After determining the SRS resource configured by the network device for the terminal, the LMF may request the network device to trigger the terminal to send the SRS.

S608: The network device sends a response message of the second request message to the LMF.

S609: The network device sends SRS resource configuration information to each network device participating in positioning.

It should be understood that the SRS resource configuration information may further include all information for implementing uplink positioning measurement.

S610: Each network device measures the SRS sent by the terminal, to obtain a measurement result.

S611: Each network device sends the obtained measurement result to the LMF, so that the LMF determines a location of the terminal.

It should be noted that TDOA based positioning is used as an example in FIG. 6. FIG. 6 includes only some steps in some embodiments that are different from those in conventional technologies, and does not show all steps, for example, a step in which the terminal reports the second message to the network device and a step in which the network device sends the second indication information to the terminal. For details about all the steps in FIG. 6, refer to an uplink TDOA based positioning procedure in conventional technologies.

In some embodiments, a plurality of cells may be considered as one positioning area, and one SRS resource is configured for one positioning area, that is, a plurality of cells correspond to one SRS resource. In a positioning process, only when the terminal moves from one positioning area to another positioning area, does the terminal need to re-obtain a corresponding reference signal resource to send the SRS. Compared with conventional technologies in which one cell corresponds to one reference signal resource, that is, an SRS resource needs to be re-obtained after handover from one cell to another cell, in this solution, the terminal does not need to obtain SRS configuration information frequently. This can reduce energy consumption of the terminal.

In the foregoing embodiments provided in this application, the method provided in embodiments of this application is described from a perspective of interaction between the terminal, the network device, and the location management device. To implement functions in the foregoing method provided in embodiments of this application, the terminal, the network device, and the location management device may include hardware structures and/or software modules, to implement the foregoing functions in a form of the hardware structures, the software modules, or a combination of the hardware structures and the software modules. Whether a function in the foregoing functions is performed by using the hardware structure, the software module, or the combination of the hardware structure and the software module depends on particular applications and design constraints of the technical solutions.

With reference to the accompanying drawings, the following describes apparatuses configured to implement the foregoing method in embodiments of this application. Therefore, all the foregoing content may be used in the following embodiments. Repeated content is not described in detail again.

Figure 7:
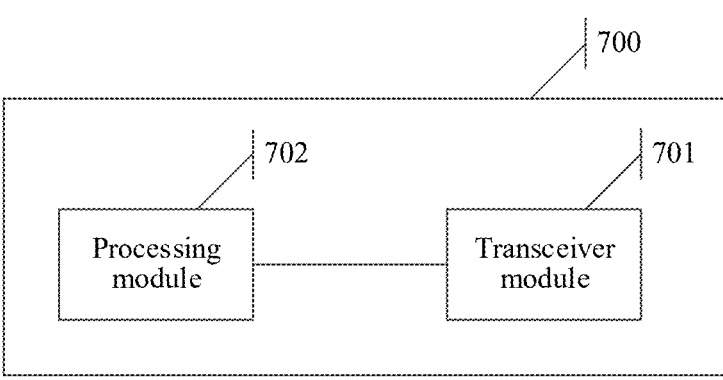
FIG. 7 is a schematic diagram of a structure of a communication apparatus according to an embodiment of this application.

FIG. 7 is a possible example block diagram of a communication apparatus in this application. The communication apparatus 700 may correspondingly implement a function or a step implemented by the terminal, the network device, or the location management device in the foregoing method embodiments. The communication apparatus may include a transceiver module 701 and a processing module 702. Optionally, the apparatus may further include a storage module. The storage module may be configured to store instructions (code or a program) and/or data. The transceiver module 701 and the processing module 702 may be coupled to the storage module. For example, the processing module 702 may read the instructions (the code or the program) and/or the data in the storage module to implement a corresponding method. The foregoing modules may be disposed independently, or may be partially or totally integrated.

It should be understood that, the processing module 702 may be a processor or a controller, for example, may be a general-purpose central processing unit (CPU), a general-purpose processor, a digital signal processor (DSP), an application-specific integrated circuit (ASIC), a field programmable gate array (FPGA) or another programmable logic device, a transistor logic device, a hardware component, or any combination thereof. The processing module may implement or execute various example logical blocks, modules, and circuits described with reference to content disclosed in this application. Alternatively, the processor may be a combination of processors implementing a computing function, for example, a combination of one or more microprocessors, or a combination of a DSP and a microprocessor. The transceiver module 701 is an interface circuit of the apparatus, and is configured to receive a signal from another apparatus. For example, when the apparatus is implemented in a form of a chip, the transceiver module 701 is an interface circuit used by the chip to receive a signal from another chip or apparatus, or is an interface circuit used by the chip to send a signal to another chip or apparatus.

The communication apparatus 700 may be the network device, the terminal, or the location management device in the foregoing embodiments, or may be a chip used in the network device, the terminal, or the location management device. For example, when the communication apparatus 700 is the network device, the terminal, or the location management device, the processing module 702 may be, for example, a processor, and the transceiver module 701 may be, for example, a transceiver. Optionally, the transceiver may include a radio frequency circuit, and the storage unit (e.g., storage circuit) may be, for example, a memory. For example, when the communication apparatus 700 is the chip used in the network device, the terminal, or the location management device, the processing module 702 may be, for example, a processor, and the transceiver module 701 may be, for example, an input/output interface, a pin, or a circuit. The processing module 702 may execute computer-executable instructions stored in the storage unit. Optionally, the storage unit is a storage unit in the chip, for example, a register or a cache. Alternatively, the storage unit may be a storage unit that is in the network device, the terminal, or the location management device and that is located outside the chip, such as a read-only memory (ROM) or another type of static storage device that can store static information and instructions, or a random access memory (RAM).

In some possible implementations, the communication apparatus 700 can correspondingly implement a behavior and the function of the terminal in the foregoing method embodiments. For example, the communication apparatus 700 may be the terminal, or may be a component (for example, a chip or a circuit) used in the terminal. The transceiver module 701 may be configured to support communication between the terminal and another network entity, for example, support communication between the terminal and the network device and/or the location management device shown in FIG. 5 or FIG. 6. The processing module 702 is configured to control and manage an action of the terminal. For example, the processing module 702 is configured to support the terminal in performing all operations, other than sending and receiving operations, of the terminal in FIG. 5 or FIG. 6.

For example, the transceiver module 701 may be configured to perform all receiving or sending operations performed by the terminal in the embodiment shown in FIG. 5, for example, S501, S502, S503, S504, S502a, S503a, and S504a in the embodiment shown in FIG. 5, and/or configured to support another process of the technology described in this disclosure. The processing module 702 is configured to perform all operations, other than the sending and receiving operations, performed by the terminal device in the embodiment shown in FIG. 5, for example, S505 in the embodiment shown in FIG. 5, and/or configured to support another process of the technology described in this disclosure.

For another example, the transceiver module 701 may be configured to perform all receiving or sending operations performed by the terminal in the embodiment shown in FIG. 6, for example, S601, S604, S605, and S607 in the embodiment shown in FIG. 6, and/or configured to support another process of the technology described in this disclosure. The processing module 702 is configured to perform all operations, other than the receiving and sending operations, performed by the terminal in the embodiment shown in FIG. 6, and/or configured to support another process of the technology described in this disclosure.

In some embodiments, the transceiver module 701 is configured to receive first indication information and a first message, where the first indication information indicates one or more positioning areas, and/or a plurality of cells included in each of the one or more positioning areas, where the first message includes one or more pieces of resource configuration information. Each piece of resource configuration information is used to configure a reference signal resource, the reference signal resource is used by the communication apparatus to send a reference signal, the reference signal is used to determine a location of the communication apparatus, and each piece of resource configuration information corresponds to one positioning area. The transceiver module 701 is further configured to send, in the positioning area indicated by the first indication information, the reference signal based on the resource configuration information corresponding to the positioning area.

In an optional implementation, after the communication apparatus 700 is handed over from a first cell to a second cell, if determining that the second cell is in a first positioning area, the processing module 702 is configured to determine to send the reference signal based on first resource configuration information corresponding to the first positioning area, where the first cell is in the first positioning area.

In an optional implementation, the transceiver module 701 is further configured to receive second indication information, where the second indication information indicates one or more positioning areas, and/or a plurality of cells included in each of the one or more positioning areas, and a priority of the second indication information is higher than a priority of the first indication information.

The transceiver module 701 is further configured to send, in the positioning area indicated by the second indication information, the reference signal based on resource configuration information corresponding to the positioning area.

In an optional implementation, the first indication information includes one or more positioning area indexes, and one positioning area index corresponds to one positioning area.

In an optional implementation, the first indication information includes one or more cell index lists, one cell index list corresponds to one positioning area, and one cell index in one cell index list corresponds to one cell.

In an optional implementation, cell indexes included in different cell index lists are partially the same.

In an optional implementation, the processing module 702 is configured to: after the communication apparatus 700 is handed over from the first cell to the second cell, obtain a cell index of the second cell; and when determining that the cell index of the second cell is in a first cell index list, determine to send the reference signal based on first resource configuration information corresponding to the first cell index list; or when determining that a cell index of the second cell is in a second cell index list, obtain second resource configuration information corresponding to the second cell index list, and determine to send the reference signal based on the second resource configuration information, where a cell index of the first cell is in the first cell index list.

In an optional implementation, the first indication information further includes one or more reference signal resource indexes, and one reference signal resource index corresponds to one positioning area or one cell index list.

In an optional implementation, the processing module 702 is configured to: after the communication apparatus 700 is handed over from the first cell to the second cell, when determining that the second cell is in a third cell index list, determine a reference signal resource index corresponding to the third cell index list; and the transceiver module 701 is configured to send the reference signal based on a reference signal resource corresponding to the reference signal resource index.

In an optional implementation, the transceiver module 701 is further configured to send a second message, where the second message includes one or more of the following information: positioning precision information, battery capacity information of the communication apparatus 700, or energy saving requirement information of the communication apparatus 700.

In an optional implementation, the first indication information is determined based on the second message.

In an optional implementation, the first indication information is carried in a SIB, a Pos SIB, an RRC message, or an LPP message.

It should be understood that the processing module 702 in some embodiments may be implemented by a processor or a processor-related circuit component, and the transceiver module 701 may be implemented by a transceiver or a transceiver-related circuit component.

In some possible implementations, the communication apparatus 700 can correspondingly implement a behavior and the function of the network device in the foregoing method embodiments. For example, the communication apparatus 700 may be the terminal, or may be a component (for example, a chip or a circuit) used in the network device. The transceiver module 701 may be configured to support communication between the network device and another network entity, for example, support communication between the network device and the terminal shown in FIG. 5 or FIG. 6. The processing module 702 is configured to control and manage an action of the network device. For example, the processing module 702 is configured to support the network device in performing all operations, other than sending and receiving operations, in FIG. 5 or FIG. 6.

For example, the transceiver module 701 may be configured to perform all receiving or sending operations performed by the network device in the embodiment shown in FIG. 5, for example, S501, S502, S503, and S504 in the embodiment shown in FIG. 5, and/or configured to support another process of the technology described in this disclosure. The processing module 702 is configured to perform all operations, other than the sending and receiving operations, performed by the network device in the embodiment shown in FIG. 5, and/or configured to support another process of the technology described in this disclosure.

For another example, the transceiver module 701 may be configured to perform all receiving or sending operations performed by the network device in the embodiment shown in FIG. 6, for example, steps other than S603 in S601 to S611 in the embodiment shown in FIG. 6, and the receiving or sending operations in S601 and S610, and/or configured to support another process of the technology described in this specification. The processing module 702 is configured to perform all operations, other than the sending and receiving operations, performed by the network device in the embodiment shown in FIG. 6, for example, S603 in the embodiment shown in FIG. 6, and/or configured to support another process of the technology described in this disclosure.

In some embodiments, the transceiver module 701 is configured to send first indication information and a first message, where the first indication information indicates one or more positioning areas, and/or a plurality of cells included in each of the one or more positioning areas. The first message includes one or more pieces of resource configuration information, where each piece of resource configuration information is used to configure a reference signal resource. The reference signal resource is used by a terminal to send a reference signal, the reference signal is used to determine a location of the terminal, and each piece of resource configuration information corresponds to one positioning area. The transceiver module 701 is further configured to receive the reference signal. The processing module 702 is configured to measure the reference signal to obtain a positioning measurement result, where the positioning measurement result is used to determine the location of the terminal. The transceiver module 701 is further configured to send the positioning measurement result to a location management device function.

In an optional implementation, the sending module is further configured to send second indication information, where the second indication information indicates one or more positioning areas, and/or a plurality of cells included in each of the one or more positioning areas, and a priority of the second indication information is higher than a priority of the first indication information.

In an optional implementation, the first indication information includes one or more positioning area indexes, and one positioning area index corresponds to one positioning area.

In an optional implementation, the first indication information includes one or more cell index lists, one cell index list corresponds to one positioning area, and one cell index in one cell index list corresponds to one cell.

In an optional implementation, cell indexes included in different cell index lists are partially the same.

In an optional implementation, the first indication information further includes one or more reference signal resource indexes, and one reference signal resource index corresponds to one positioning area or one cell index list.

In an optional implementation, the transceiver module 701 is further configured to receive a second message, where the second message includes one or more of the following information: positioning precision information, battery capacity information of the terminal, or energy saving requirement information of the terminal.

In a possible implementation, the processing module 702 is configured to determine first indication information based on the second message.

In a possible implementation, the first indication information is carried in a SIB, a Pos SIB, or an RRC message.

It should be understood that the processing module 702 in some embodiments may be implemented by a processor or a processor-related circuit component, and the transceiver module 701 may be implemented by a transceiver or a transceiver-related circuit component.

In some possible implementations, the communication apparatus 700 can correspondingly implement a behavior and the function of the location management device in the foregoing method embodiments. For example, the communication apparatus 700 may be the location management function, or may be a component (for example, a chip or a circuit) used in the location management device. The transceiver module 701 may be configured to support communication between the location management device and another network entity, for example, support communication between the location management device and the network device shown in FIG. 5 or FIG. 6. The processing module 702 is configured to control and manage an action of the location management device. For example, the processing module 702 is configured to support the location management device in performing all operations, other than sending and receiving operations, in FIG. 5 or FIG. 6.

For example, the transceiver module 701 may be configured to perform all receiving or sending operations performed by the location management device in the embodiment shown in FIG. 5, for example, S502a, S503a, and S504a in the embodiment shown in FIG. 5, and/or configured to support another process of the technology described in this disclosure. The processing module 702 is configured to perform all operations, other than the sending and receiving operations, performed by the location management device in the embodiment shown in FIG. 5.

For another example, the transceiver module 701 may be configured to perform all receiving or sending operations performed by the location management device in the embodiment shown in FIG. 6, for example, S602, S606 to S609, and S611 in the embodiment shown in FIG. 6, and the receiving or sending operation in S601, and/or configured to support another process of the technology described in this disclosure. The processing module 702 is configured to perform all operations, other than the sending and receiving operations, performed by the location management device in the embodiment shown in FIG. 6, and/or configured to support another process of the technology described in this disclosure.

In some embodiments, the transceiver module 701 is configured to: send first indication information, and receive a positioning measurement result, where the first indication information indicates one or more positioning areas, and/or a plurality of cells included in each of the one or more positioning areas. The positioning measurement result is obtained by performing measurement based on a reference signal sent by a terminal. The processing module 702 is configured to determine a location of the terminal based on the positioning measurement result.

In an optional implementation, the transceiver module 701 is further configured to receive a second message, where the second message includes one or more of the following information: positioning precision information, battery capacity information of the terminal, or energy saving requirement information of the terminal.

In an optional implementation, the first indication information or the second message is carried in an LPP message, that is, carried in dedicated signaling between the terminal and the LMF.

It should be understood that the processing module 702 in some embodiments may be implemented by a processor or a processor-related circuit component, and the transceiver module 701 may be implemented by a transceiver or a transceiver-related circuit component.

Figure 8:
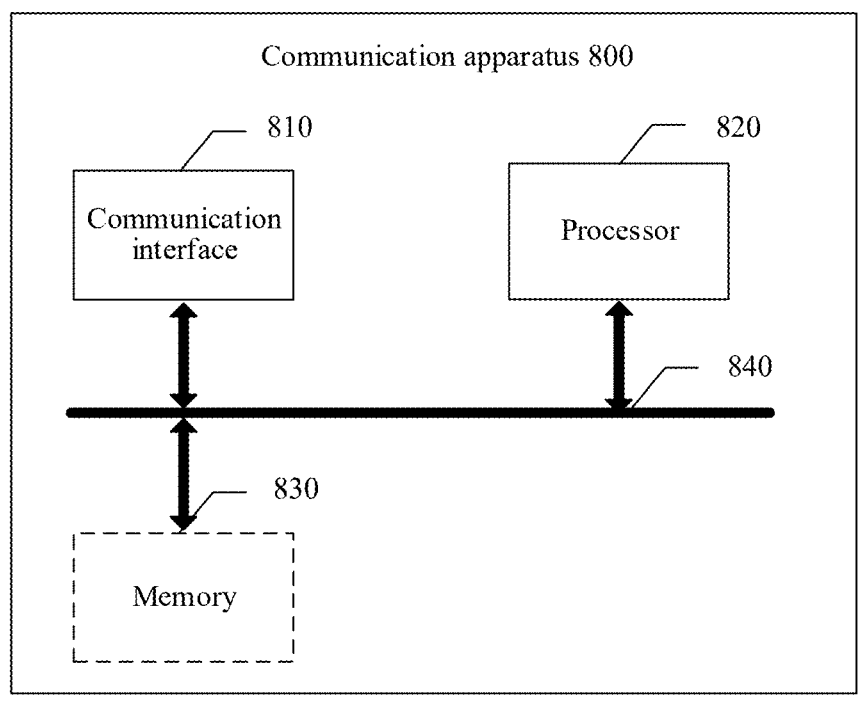
FIG. 8 is another schematic diagram of a structure of a communication apparatus according to an embodiment of this application.

FIG. 8 shows a communication apparatus 800 according to an embodiment of this application. The communication apparatus 800 may be a network device, and can implement a function of the network device in the method provided in embodiments of this application. Alternatively, the communication apparatus 800 may be a terminal, and can implement a function of the terminal in the method provided in embodiments of this application. Alternatively, the communication apparatus 800 may be a location management device, and can implement a function of the location management device in the method provided in embodiments of this application. Alternatively, the communication apparatus

800 may be an apparatus that can support a network device, a terminal, or a location management device in implementing a corresponding function in the method provided in embodiments of this application. The communication apparatus 800 may be a chip system. In some embodiments, the chip system may include a chip, or may include a chip and another discrete component.

In terms of a hardware implementation, the transceiver module 701 may be a transceiver, and the transceiver is integrated into the communication apparatus 800 to form a communication interface 810.

The communication apparatus 800 includes at least one processor 820. The processor 820 may be a CPU, a microprocessor, an ASIC, or one or more integrated circuits configured to control program execution of the solutions in this application, and is configured to implement or support the communication apparatus 800 in implementing the function of the network device, the terminal, or the location management device in the method provided in embodiments of this application. For details, refer to detailed descriptions in the method example. Details are not described herein again.

The communication apparatus 800 may further include at least one memory 830, configured to store program instructions and/or data. The memory 830 is coupled to the processor 820. The coupling in some embodiments may be an indirect coupling or a communication connection between apparatuses, units (e.g., circuits), or modules in an electrical form, a mechanical form, or another form, and is used for information exchange between the apparatuses, the units, or the modules. The processor 820 may cooperate with the memory 830. The processor 820 may execute the program instructions and/or the data stored in the memory 830, to enable the communication apparatus 800 to implement a corresponding method. At least one of the at least one memory may be included in the processor 820.

The communication apparatus 800 may further include the communication interface 810, and is configured to communicate with another device or communication network, such as a RAN, a WLAN, or a wired access network by using any apparatus such as a transceiver. The communication interface 810 is configured to communicate with another device by using a transmission medium, so that an apparatus in the communication apparatus 800 can communicate with the another device. For example, when the communication apparatus 800 is the network device, the another device is the terminal or the location management function. Alternatively, when the communication apparatus is the terminal, the another device is the network device. The processor 820 may send and receive data through the communication interface 810. The communication interface 810 may be a transceiver.

A specific connection medium between the communication interface 810, the processor 820, and the memory 830 is not limited in some embodiments. In some embodiments, the memory 830, the processor 820, and the communication interface 810 are connected by using a bus 840 in FIG. 8, where the bus is represented by a bold line in FIG. 8. A connection manner between other components is merely schematically described, and imposes no limitation. The bus may be classified into an address bus, a data bus, a control bus, and the like. For ease of representation, only one bold line is for representing the bus in FIG. 8, but this does not mean that there is only one bus or only one type of bus.

In some embodiments, the processor 820 may be a general-purpose processor, a digital signal processor, an application-specific integrated circuit, a field programmable gate array or another programmable logic device, a discrete gate or a transistor logic device, or a discrete hardware component, and may implement or execute the methods, steps, and logical block diagrams disclosed in embodiments of this application. The general-purpose processor may be a microprocessor, any conventional processor, or the like. The steps of the method disclosed with reference to embodiments of this application may be directly performed by a hardware processor, or may be performed by a combination of hardware in the processor and a software module.

The memory 830 may be a ROM, another type of static storage device that can store static information and instructions, a RAM, or another type of dynamic storage device that can store information and instructions, or may be an electrically erasable programmable read-only memory (EE-PROM), a compact disc read-only memory (CD-ROM) or another compact disc storage, an optical disc storage (including a compact disc, a laser disc, an optical disc, a digital versatile disc, a Blu-ray disc, or the like), a magnetic disk storage medium or another magnetic storage device, or any other medium that can be configured to carry or store expected program code in a form of an instruction or a data structure and that can be accessed by a computer. However, the memory 830 is not limited thereto. The memory may exist independently and is connected to the processor by using a communication line 840. The memory may alternatively be integrated with the processor.

The memory 830 is configured to store computer-executable instructions for performing the solutions in this application, and the processor 820 controls execution. The processor 820 is configured to execute the computer-executable instructions stored in the memory 830, to implement the service management method provided in the foregoing embodiments of this application.

Optionally, the computer-executable instructions in some embodiments may also be referred to as application program code. This is not specifically limited in some embodiments.

It should be noted that the communication apparatus in the foregoing embodiments may be a terminal, a circuit, a chip used in the terminal, or another combined component, component, or the like that has a function of the terminal. When the communication apparatus is the terminal, the transceiver module may be a transceiver, and may include an antenna, a radio frequency circuit, and the like. The processing module may be a processor, for example, a central processing unit (CPU). When the communication apparatus is the component that has the function of the terminal, the transceiver module may be a radio frequency unit, and the processing module may be a processor. When the communication apparatus is the chip or a chip system, the transceiver module may be an input/output interface of the chip or the chip system, and the processing module may be a processor of the chip or the chip system.

Figure 9:
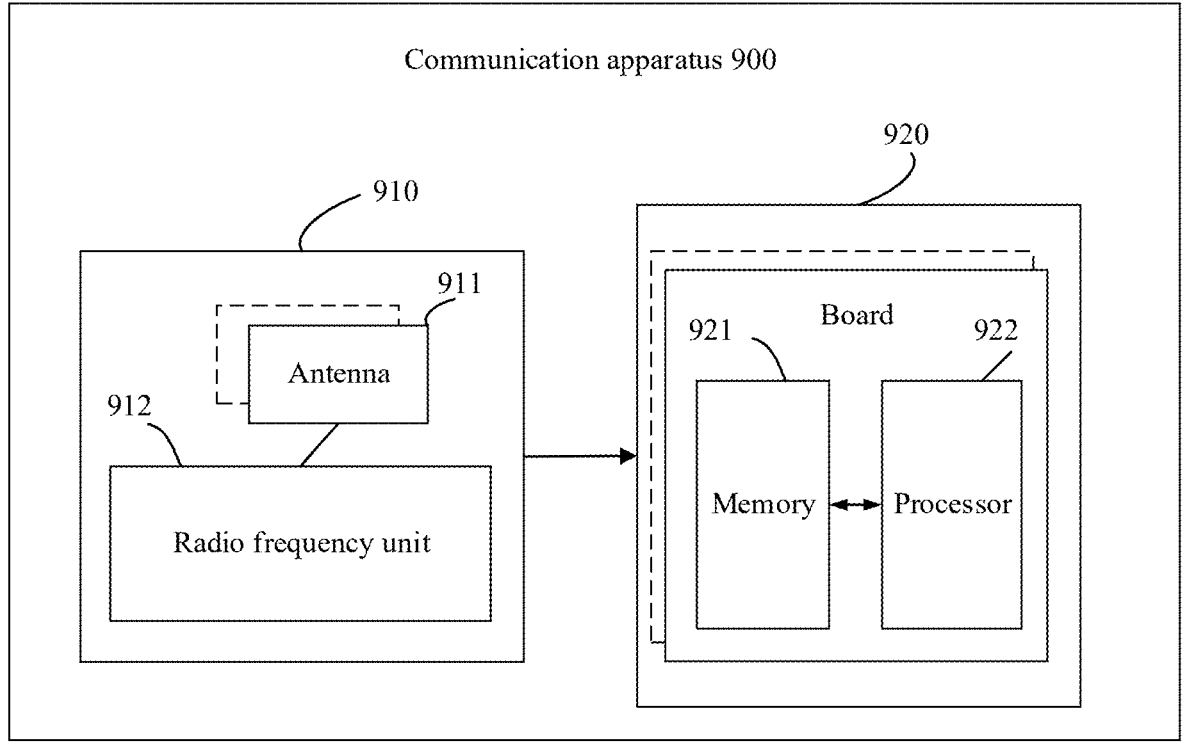
FIG. 9 is another schematic diagram of a structure of a first communication apparatus according to an embodiment of this application.

FIG. 9 is a schematic diagram of a simplified structure of a communication apparatus. For ease of understanding and illustration, in FIG. 9, for example, the communication apparatus is a base station. The base station may be used in the systems shown in FIG. 2 to FIG. 4, and may be the network device in FIG. 2 to FIG. 4 and perform a function of the network device in the foregoing method embodiments.

The communication apparatus 900 may include a transceiver 910, a memory 921, and a processor 922. The transceiver 910 may be used by the communication apparatus to perform communication, for example, configured to send or receive the foregoing indication information. The memory 921 is coupled to the processor 922, and may be configured to store a program and data that are necessary for implementing functions by the communication apparatus 900. The processor 922 is configured to support the communication apparatus 900 in performing the corresponding functions in the foregoing method. The functions may be implemented by invoking the program stored in the memory 921.

Specifically, the transceiver 910 may be a wireless transceiver, and may be configured to support the communication apparatus 900 in receiving and sending signaling and/or data through a radio air interface. The transceiver 910 may also be referred to as a transceiver unit (e.g., transceiver circuit) or a communication unit (e.g., communication circuit). The transceiver 910 may include one or more radio frequency units 912 (e.g., radio frequency circuits) and one or more antennas 911. The radio frequency unit, for example, a remote radio unit (RRU) or an active antenna unit (AAU), may be configured to: transmit a radio frequency signal, and perform conversion between the radio frequency signal and a baseband signal. The one or more antennas may be configured to radiate and receive the radio frequency signal. Optionally, the transceiver 910 may include only the foregoing radio frequency unit. In this case, the communication apparatus 900 may include the transceiver 910, the memory 921, the processor 922, and the antenna.

The memory 921 and the processor 922 may be integrated together or may be independent of each other. As shown in FIG. 9, the memory 921 and the processor 922 may be integrated into a control unit 920 (e.g., control circuit) of the communication apparatus 900. For example, the control unit 920 may include a baseband unit (BBU) of an LTE base station, and the baseband unit may also be referred to as a digital unit (DU); or the control unit 920 may include a distributed unit (DU) and/or a central unit (CU) in a base station in 5G or a future radio access technology. The control unit 920 may include one or more antenna panels. A plurality of antenna panels may jointly support a radio access network (for example, an LTE network) of a single access standard, or a plurality of antenna panels may separately support radio access networks (for example, an LTE network, a 5G network, and another network) of different access standards. The memory 921 and the processor 922 may serve one or more antenna panels. In other words, the memory 921 and the processor 922 may be separately disposed on each antenna panel. Alternatively, the plurality of antenna panels may share a same memory 921 and a same processor 922. In addition, a necessary circuit may be disposed on each antenna panel. For example, the circuit may be configured to implement coupling between the memory 921 and the processor 922. The transceiver 910, the processor 922, and the memory 921 may be connected to each other by using a bus structure and/or another connection medium.

Based on the structure shown in FIG. 9, when the communication apparatus 900 needs to send data, the processor 922 may perform baseband processing on the to-be-sent data and output a baseband signal to the radio frequency unit, and the radio frequency unit performs radio frequency processing on the baseband signal and sends a radio frequency signal in an electromagnetic wave form through the antenna. When data is sent to the communication apparatus 900, the radio frequency unit receives a radio frequency signal through the antenna, converts the radio frequency signal into a baseband signal, and outputs the baseband signal to the processor 922. The processor 922 converts the baseband signal into data, and processes the data.

Based on the structure shown in FIG. 9, the transceiver 910 may be configured to perform the foregoing steps performed by the transceiver module 701, and/or the processor 922 may be configured to invoke instructions in the memory 921, to perform the steps performed by the processing module 702.

Figure 10:
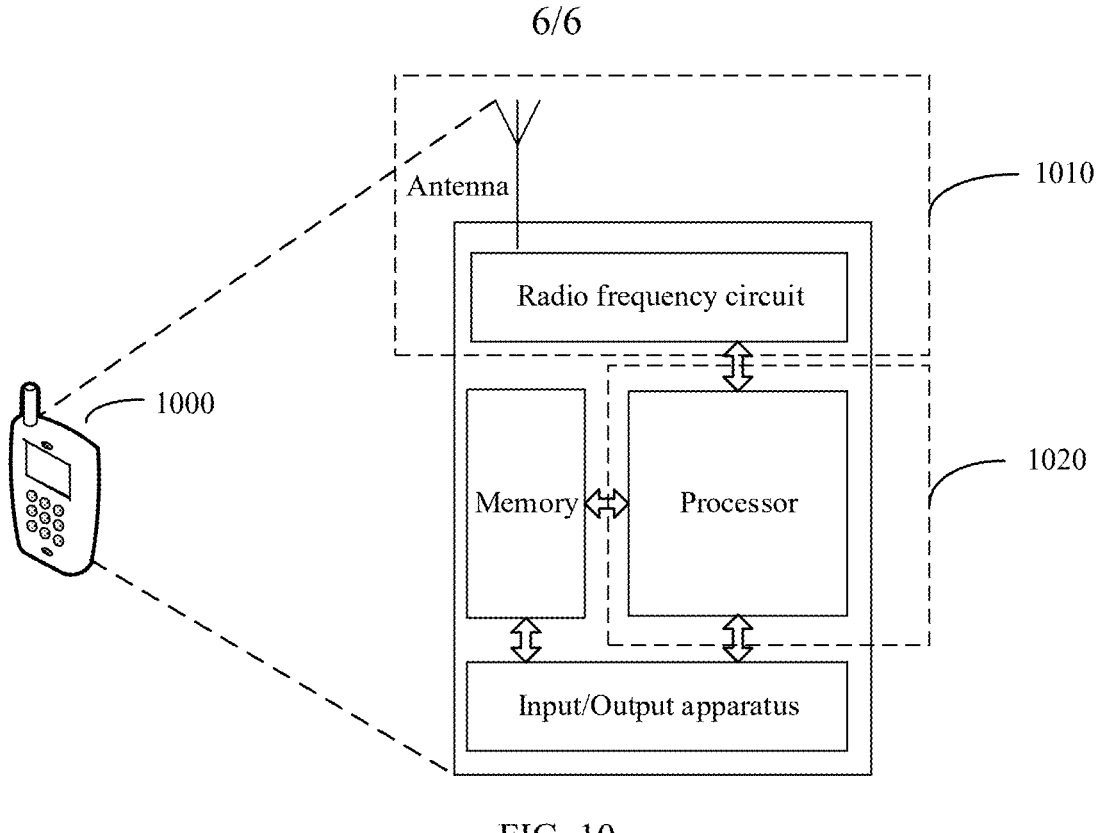
FIG. 10 is another schematic diagram of a structure of a second communication apparatus according to an embodiment of this application.

FIG. 10 is a schematic diagram of a simplified structure of a terminal. For ease of understanding and illustration, in FIG. 10, an example in which the terminal is a mobile phone is used. As shown in FIG. 10, the terminal includes a processor, a memory, a radio frequency circuit, an antenna, and an input/output apparatus. The processor is configured to process a communication protocol and communication data, control an on-board unit, execute a software program, process data of the software program, and so on. The memory is configured to store the software program and data. The radio frequency circuit is configured to: perform conversion between a baseband signal and a radio frequency signal, and process the radio frequency signal. The antenna is configured to receive and send a radio frequency signal in an electromagnetic wave form. The input/output apparatus, such as a touchscreen, a display, or a keyboard, is configured to: receive data input by a user and output data to the user. It should be noted that some types of devices may have no input/output apparatus.

When needing to send data, after performing baseband processing on the to-be-sent data, the processor outputs a baseband signal to the radio frequency circuit; and the radio frequency circuit performs radio frequency processing on the baseband signal and then sends the radio frequency signal to the outside in an electromagnetic wave form through the antenna. When data is sent to the device, the radio frequency circuit receives a radio frequency signal through the antenna, converts the radio frequency signal into a baseband signal, and outputs the baseband signal to the processor. The processor converts the baseband signal into data, and processes the data. For ease of description, FIG. 10 shows only one memory and one processor. In an actual device product, there may be one or more processors and one or more memories. The memory may also be referred to as a storage medium, a storage device, or the like. The memory may be disposed independent of the processor, or may be integrated with the processor. This is not limited in embodiments of this application.

In some embodiments, the antenna and the radio frequency circuit that have receiving and sending functions may be considered as a transceiver unit of the apparatus, and the processor having a processing function may be considered as a processing unit of the apparatus. As shown in FIG. 10, the apparatus 1000 includes a transceiver unit 1010 (e.g., transceiver circuit) and a processing unit 1020. The transceiver unit 1010 may also be referred to as a transceiver, a transceiver machine, a transceiver apparatus, or the like. The processing unit 1020 may also be referred to as a processor, a processing board, a processing module, a processing apparatus, or the like. Optionally, a component configured to implement the receiving function in the transceiver unit 1010 may be considered as a receiving unit (e.g., receiver circuit), and a component configured to implement the sending function in the transceiver unit 1010 may be considered as a sending unit (e.g., sending circuit). That is, the transceiver unit 1010 includes the receiving unit and the sending unit. The transceiver unit 1010 sometimes may also be referred to as a transceiver machine, a transceiver, a transceiver circuit, or the like. The receiving unit sometimes may also be referred to as a receiver machine, a receiver, a receiver circuit, or the like. The sending unit sometimes may also be referred to as a transmitter machine, a transmitter, a transmitter circuit, or the like.

It should be understood that the transceiver unit 1010 is configured to perform a sending operation and a receiving operation on a terminal side in the foregoing method embodiments, and the processing unit 1020 is configured to perform an operation, other than the sending and receiving operations, of the terminal in the foregoing method embodiments.

For example, in an implementation, the transceiver unit 1010 may be configured to perform S501 to S504 in the embodiment shown in FIG. 5, and/or configured to support another process of the technology described in this disclosure. The processing unit 1020 may be configured to perform S505 in the embodiment shown in FIG. 5, and/or configured to support another process of the technology described in this disclosure.

When the communication apparatus is a chip apparatus or circuit, the apparatus may include a transceiver unit and a processing unit. The transceiver unit may be an input/output circuit and/or a communication interface. The processing unit is an integrated processor, a microprocessor, or an integrated circuit.

An embodiment of this application further provides a communication system. Specifically, the communication system includes a network device, a terminal, and a location management device, or may include more network devices, more terminals, and more location management devices. For example, the communication system includes a network device, a terminal, and a location management device that are configured to implement related functions in the embodiment in FIG. 5 or FIG. 6.

The network device is configured to implement a related function of a network device part in embodiments of this application, for example, configured to implement the related function of the network device part in the embodiment shown in FIG. 5 or FIG. 6. The terminal is configured to implement a related function of a terminal part in embodiments of this application, for example, configured to implement the related function of the terminal in the embodiment shown in FIG. 5 or FIG. 6. The location management device is configured to implement a related function of a location management device part in FIG. 5 or FIG. 6. For details, refer to the related descriptions in the method embodiments. Details are not described herein again.

An embodiment of this application further provides a computer-readable storage medium, including instructions. When the instructions are run on a computer, the computer is enabled to perform the method performed by the network device, the terminal, or the location management device in FIG. 5 or FIG. 6.

An embodiment of this application further provides a computer program product, including instructions. When the computer program product runs on a computer, the computer is enabled to perform the method performed by the network device, the terminal, or the location management device in FIG. 5 or FIG. 6.

An embodiment of this application provides a chip system. The chip system includes a processor, and may further include a memory, configured to implement functions of the network device, the terminal, and the location management device in the foregoing method. The chip system may include a chip, or may include a chip and another discrete component.

All or some of the methods in embodiments of this application may be implemented by software, hardware, firmware, or any combination thereof. When software is used to implement the methods, all or some of the methods may be implemented in a form of a computer program product. The computer program product includes one or more computer instructions. When the computer program instructions are loaded and executed on the computer, the procedures, or functions according to embodiments of the present disclosure are all or partially generated. The computer may be a general-purpose computer, a dedicated computer, a computer network, a network device, user equipment, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL for short)) or wireless (for example, infrared, radio, or microwave) manner. The computer-readable storage medium may be any usable medium accessible by the computer, or a data storage device such as a server or a data center, integrating one or more usable media. The usable medium may be a magnetic medium (for example, a floppy disk, a hard disk, or a magnetic tape), an optical medium (for example, a digital video disc (DVD for short)), a semiconductor medium (for example, an solid state drive (SSD)), or the like.

It is clear that a person skilled in the art can make various modifications and variations to this application without departing from the scope of this application. In this way, this application is intended to cover these modifications and variations of this application provided that they fall within the scope of the claims of this application and their equivalent technologies.

What is claimed is:

1. An uplink positioning method, comprising:
   receiving, by a communication device, first indication information, wherein the first indication information indicates at least one of one or more positioning areas or a plurality of cells comprised in each of the one or more positioning areas;
   receiving, by the communication device, a first message, wherein the first message comprises one or more pieces of resource configuration information, each piece of resource configuration information is used to configure a reference signal resource, the reference signal resource is used by the communication device to send a reference signal, the reference signal is used to determine a location of the communication device, and each piece of the resource configuration information corresponds to one positioning area; and
   sending, by the communication device, in the positioning area indicated by the first indication information, the reference signal based on the resource configuration information corresponding to the positioning area.

2. The method according to claim 1, wherein the sending, by the communication device, in the positioning area indicated by the first indication information, the reference signal based on the resource configuration information corresponding to the positioning area comprises:
   handing over, by the communication device, from a first cell to a second cell, wherein the first cell is in a first positioning area; and
   when the communication device determines that the second cell is in the first positioning area, sending, by the communication device, the reference signal based on first resource configuration information corresponding to the first positioning area; or when the communication device determines that the second cell is in a second positioning area, obtaining, by the communication device, second resource configuration information corresponding to the second positioning area, and sending the reference signal based on the second resource configuration information.

3. The method according to claim 1, wherein the method further comprises:

receiving, by the communication device, second indication information, wherein the second indication information indicates at least one of one or more positioning areas or a plurality of cells comprised in each of the one or more positioning areas, and a priority of the second indication information is higher than a priority of the first indication information; and sending, by the communication device, in the positioning area indicated by the second indication information, the reference signal based on the resource configuration information corresponding to the positioning area.

4. The method according to claim 1, wherein the first indication information comprises one or more positioning area indexes, and one positioning area index corresponds to one positioning area.

5. The method according to claim 1, wherein the first indication information comprises one or more cell index lists, one cell index list corresponds to one positioning area, and one cell index in one cell index list corresponds to one cell.

6. The method according to claim 5, wherein the sending, by the communication device in the positioning area indicated by the first indication information, the reference signal based on the resource configuration information corresponding to the positioning area comprises:

handing over, by the communication device, from a first cell to a second cell, and obtaining a cell index of the second cell, wherein a cell index of the first cell is in a first cell index list; and when the communication device determines that the cell index of the second cell is in the first cell index list, sending, by the communication device, the reference signal based on first resource configuration information corresponding to the first cell index list; or when the communication device determines that the cell index of the second cell is in a second cell index list, obtaining, by the communication device, second resource configuration information corresponding to the second cell index list, and sending the reference signal based on the second resource configuration information.

7. The method according to claim 1, wherein the first indication information further comprises one or more reference signal resource indexes, and one reference signal resource index corresponds to one positioning area or one cell index list.

8. The method according to claim 7, wherein the method further comprises:

handing over, by the communication device, from a first cell to a second cell;

when the communication device determines that the second cell is in a third cell index list, determining, by the communication device, a reference signal resource index corresponding to the third cell index list; and sending, by the communication device, the reference signal based on a reference signal resource corresponding to the reference signal resource index.

9. An apparatus, comprising:

a processor; and a memory storing a program to be executed by the processor, the program including instructions to:

receive first indication information, wherein the first indication information indicates at least one of one or more positioning areas or a plurality of cells comprised in each of the one or more positioning areas;

receive a first message, wherein the first message comprises one or more pieces of resource configuration information, each piece of resource configuration information is used to configure a reference signal resource, the reference signal resource is used by the apparatus to send a reference signal, the reference signal is used to determine a location of the apparatus, and each piece of the resource configuration information corresponds to one positioning area; and send in the positioning area indicated by the first indication information, the reference signal based on the resource configuration information corresponding to the positioning area.

10. The apparatus according to claim 9, wherein the program includes instructions to:

hand over from a first cell to a second cell, wherein the first cell is in a first positioning area; and when the apparatus determines that the second cell is in the first positioning area, send the reference signal based on first resource configuration information corresponding to the first positioning area; or when the apparatus determines that the second cell is in a second positioning area, obtain second resource configuration information corresponding to the second positioning area, and sending the reference signal based on the second resource configuration information.

11. The apparatus according to claim 9, wherein the program includes instructions to:

receive second indication information, wherein the second indication information indicates at least one of one or more positioning areas or a plurality of cells comprised in each of the one or more positioning areas, and a priority of the second indication information is higher than a priority of the first indication information; and send in the positioning area indicated by the second indication information, the reference signal based on resource configuration information corresponding to the positioning area.

12. The apparatus according to claim 9, wherein the first indication information comprises one or more positioning area indexes, and one positioning area index corresponds to one positioning area.

13. The apparatus according to claim 9, wherein the first indication information comprises one or more cell index lists, one cell index list corresponds to one positioning area, and one cell index in one cell index list corresponds to one cell.

14. The apparatus according to claim 13, wherein the program includes instructions to:

hand over from a first cell to a second cell, and obtaining a cell index of the second cell, wherein a cell index of the first cell is in a first cell index list; and when the apparatus determines that the cell index of the second cell is in the first cell index list, send the reference signal based on first resource configuration information corresponding to the first cell index list; or when the apparatus determines that the cell index of the second cell is in a second cell index list, obtain second resource configuration information corresponding to the second cell index list, and sending the reference signal based on the second resource configuration information.

15. The apparatus according to claim 9, wherein the first indication information further comprises one or more reference signal resource indexes, and one reference signal resource index corresponds to one positioning area or one cell index list.

16. A non-transitory computer-readable storage medium storing instructions that when executed cause an apparatus to perform operations, comprising:

receiving first indication information, wherein the first indication information indicates at least one of one or more positioning areas or a plurality of cells comprised in each of the one or more positioning areas;

receiving a first message, wherein the first message comprises one or more pieces of resource configuration information, each piece of resource configuration information is used to configure a reference signal resource, the reference signal resource is used by the apparatus to send a reference signal, the reference signal is used to determine a location of the apparatus, and each piece of the resource configuration information corresponds to one positioning area; and sending in the positioning area indicated by the first indication information, the reference signal based on the resource configuration information corresponding to the positioning area.

17. The non-transitory computer-readable storage medium according to claim 16, wherein the sending in the positioning area indicated by the first indication information, the reference signal based on the resource configuration information corresponding to the positioning area comprises:

handing over from a first cell to a second cell, wherein the first cell is in a first positioning area; and when the apparatus determines that the second cell is in the first positioning area, sending, by the apparatus, the reference signal based on first resource configuration information corresponding to the first positioning area; or when the apparatus determines that the second cell is in a second positioning area, obtaining, by the apparatus, second resource configuration information corresponding to the second positioning area, and sending the reference signal based on the second resource configuration information.

18. The non-transitory computer-readable storage medium according to claim 16, wherein the apparatus is further caused to perform operations comprising:

receiving, by the apparatus, second indication information, wherein the second indication information indicates at least one of one or more positioning areas or a plurality of cells comprised in each of the one or more positioning areas, and a priority of the second indication information is higher than a priority of the first indication information; and sending, by the apparatus, in the positioning area indicated by the second indication information, the reference signal based on the resource configuration information corresponding to the positioning area.

19. The non-transitory computer-readable storage medium according to claim 16, wherein the first indication information comprises one or more positioning area indexes, and one positioning area index corresponds to one positioning area.

20. The non-transitory computer-readable storage medium according to claim 16, wherein the first indication information comprises one or more cell index lists, one cell index list corresponds to one positioning area, and one cell index in one cell index list corresponds to one cell.

* * * * *